United States Patent
Kim et al.

(10) Patent No.: US 9,615,346 B2
(45) Date of Patent: Apr. 4, 2017

(54) METHOD AND APPARATUS FOR NOTIFYING INFORMATION CHANGE IN WIRELESS COMMUNICATION SYSTEM

(71) Applicant: LG ELECTRONICS INC., Seoul (KR)

(72) Inventors: Seongyun Kim, Anyang-si (KR); Seungkyu Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/443,943

(22) PCT Filed: Dec. 5, 2013

(86) PCT No.: PCT/KR2013/011213
§ 371 (c)(1),
(2) Date: May 19, 2015

(87) PCT Pub. No.: WO2014/088339
PCT Pub. Date: Jun. 12, 2014

(65) Prior Publication Data
US 2015/0296470 A1    Oct. 15, 2015

Related U.S. Application Data

(60) Provisional application No. 61/733,469, filed on Dec. 5, 2012, provisional application No. 61/765,004, filed
(Continued)

(51) Int. Cl.
*H04W 60/00* (2009.01)
*H04W 12/06* (2009.01)
(Continued)

(52) U.S. Cl.
CPC ............ *H04W 60/00* (2013.01); *G06F 8/665* (2013.01); *H04L 9/32* (2013.01); *H04L 41/082* (2013.01); *H04W 4/005* (2013.01); *H04W 12/06* (2013.01)

(58) Field of Classification Search
CPC ..... H04W 36/38; H04W 60/00; H04W 4/005; H04L 63/0428; H04L 41/082; G06F 8/665; G06Q 30/0267; G06Q 30/0246
USPC ............ 455/436, 412.2; 705/14.45; 709/224; 717/172; 379/88.13; 370/395.5
See application file for complete search history.

(56) References Cited

U.S. PATENT DOCUMENTS

2007/0079306 A1    4/2007  Qumei
2007/0283443 A1    12/2007 McPherson et al.
(Continued)

FOREIGN PATENT DOCUMENTS

EP    2184887 A1    5/2010
JP    10-32205 A    2/1998
(Continued)

OTHER PUBLICATIONS

Electronic Telecommunications Standards Institute, "Machine-to-Machine Communications (M2M); Functional Architecture," ETSI TS 102 690 V1.1.1, Oct. 2011, pp. 1-280.
(Continued)

*Primary Examiner* — Phuoc H Doan
(74) *Attorney, Agent, or Firm* — Birch, Stewart, Kolasch & Birch, LLP

(57) ABSTRACT

A method for a terminal for notifying a change in a resource group(s) supported by a terminal due to a firmware update in a wireless communication system, according to an embodiment of the present invention, can comprise the steps of: receiving, from a server, a command for setting an indicator for managing a notification; receiving, from the server, a command for managing a firmware update; and
(Continued)

transmitting, to the sever, information regarding the resource group(s) supported by and usable on the terminal if the indicator is set and the resource group(s) supported by the terminal has changed due to the update.

12 Claims, 7 Drawing Sheets

Related U.S. Application Data on Feb. 14, 2013, provisional application No. 61/809,403, filed on Apr. 7, 2013, provisional application No. 61/809,405, filed on Apr. 7, 2013, provisional application No. 61/809,404, filed on Apr. 7, 2013, provisional application No. 61/822,411, filed on May 12, 2013.

(51) Int. Cl.
*H04L 12/24* (2006.01)
*G06F 9/445* (2006.01)
*H04L 9/32* (2006.01)
*H04W 4/00* (2009.01)

(56) References Cited

U.S. PATENT DOCUMENTS

| | | |
|---|---|---|
| 2007/0288984 A1 | 12/2007 | Kim |
| 2008/0059959 A1 | 3/2008 | Chen et al. |
| 2010/0138537 A1 | 6/2010 | Ye et al. |
| 2012/0028614 A1* | 2/2012 | Bertin .................. H04W 4/001 455/412.2 |
| 2012/0124201 A1 | 5/2012 | Muhanna et al. |
| 2012/0124615 A1 | 5/2012 | Lee |
| 2012/0290596 A1 | 11/2012 | Ingles |
| 2014/0007067 A1* | 1/2014 | Nelson .................. G06F 8/665 717/168 |
| 2014/0366012 A1* | 12/2014 | Jamadagni ............ H04W 8/245 717/171 |

FOREIGN PATENT DOCUMENTS

| | | |
|---|---|---|
| JP | 2000-47997 A | 2/2000 |
| JP | 2000-99477 A | 4/2000 |
| JP | 2009-539183 A | 11/2009 |
| JP | 2010-516212 A | 5/2010 |
| KR | 10-2006-0023630 A | 3/2006 |
| KR | 10-2007-101507 A | 10/2007 |
| KR | 10-2010-0011142 A | 2/2010 |
| KR | 10-2010-0026874 A | 3/2010 |
| KR | 10-2012-0051967 A | 5/2012 |
| KR | 10-2012-0127204 A | 11/2012 |
| WO | WO 2012/068465 A1 | 5/2012 |

OTHER PUBLICATIONS

Open Mobile Alliance, "Lightweight Machine to Machine Technical Specification," Draft Version 1.0, OMA-TS-LightweightM2M-V1_0-201211130-D, Nov. 30, 2012, pp. 1-44.

* cited by examiner

FIG. 3
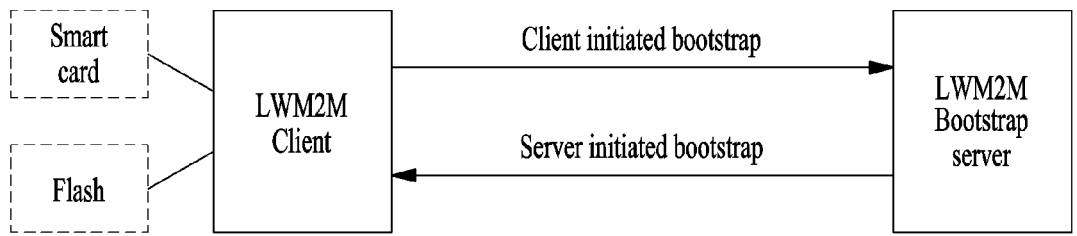
(a)
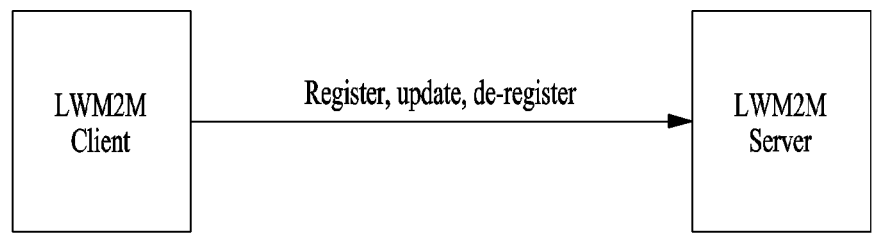
(b)
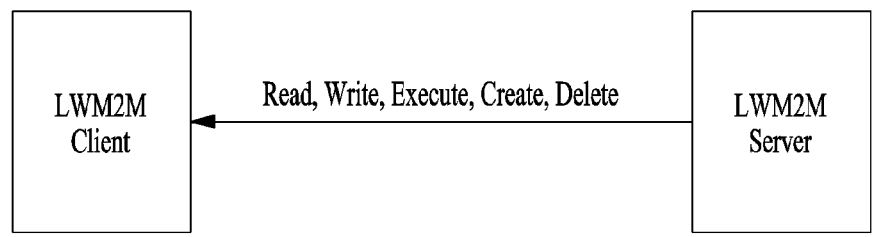
(c)
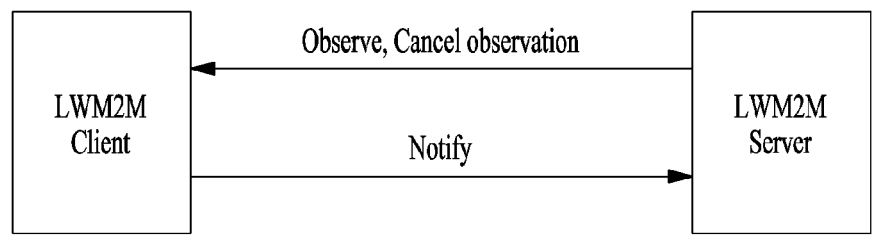
(d)

METHOD AND APPARATUS FOR NOTIFYING INFORMATION CHANGE IN WIRELESS COMMUNICATION SYSTEM

CROSS REFERENCE TO RELATED APPLICATIONS

This application is the National Phase of PCT International Application No. PCT/KR2013/011213, filed on Dec. 5, 2013, which claims priority under 35 U.S.C. 119(e) to U.S. Provisional Application No. 61/733,469, filed on Dec. 5, 2012, 61/765,004, filed on Feb. 14, 2013, 61/809,403, filed on Apr. 7, 2013, 61/809,405, filed on Apr. 7, 2013, 61/809,404, filed on Apr. 7, 2013, 61/822,411, filed on May 12, 2013, all of which are hereby expressly incorporated by reference into the present application.

TECHNICAL FIELD

The present invention relates to a method and apparatus for notifying of information change in a wireless communication system.

BACKGROUND ART

M2M (Machine to Machine) communication technology has come into the spotlight with the advent of ubiquitous era. M2M can be used for various applications such as e-health, smart grid, smart home, etc. In these applications, M2M devices having various hardware specifications are used and thus a protocol which can accommodate any type of M2M device is needed. Accordingly, it is necessary to develop an application layer protocol suitable for resource-limited M2M devices. This protocol is applicable to resource-limited M2M devices and thus can also be applied to M2M devices having different specifications.

Conventionally, for firmware or software update, when a specific M2M server (a different type of server) updates firmware or software of a client/device, the client/device announces completion of the update to the specific M2M server. However, this announcement is not efficient in a multi-server environment. That is, servers other than the server implementing update are not informed of a function added to the client/terminal through update and thus cannot use the added function until they identify the function using another method. If there is no way to know the function provided by the client/terminal, the function cannot be used. That is, even if the function is supported by the client/terminal, a server that needs the function cannot recognize whether or not the client/terminal supports the function, and thus the function cannot be used/managed. To address this problem, the present invention proposes a method for notifying a server of functions added through firmware or software update to allow the server to use the functions, and also proposes a notification function for update of functions or resources supportable/usable by a client/terminal including the aforementioned firmware or software.

DISCLOSURE

Technical Problem

An object of the present invention devised to solve the problem lies in a method for notifying M2M server(s) of update of a specific function or a specific resource or update or information changed through the update.

Objects of the present invention are not limited to the aforementioned object, and other objects of the present invention which are not mentioned above will become apparent to those having ordinary skill in the art upon examination of the following description.

Technical Solution

In a first aspect of the present invention, provided herein is a method for notifying, by a terminal, change of resource group(s) supported by the terminal due to update of firmware in a wireless communication system, the method including receiving, from a server, an operation command for configuring an indicator for indicating the notification, receiving, from the server, an operation command for indicating execution of the update of the firmware, and transmitting, to the server, information about the resource group(s) supported by the terminal and/or resource group(s) available to the terminal when the indicator is configured, and the resource group(s) supported by the terminal is changed according to execution of the update.

Preferably, the operation command for configuring the indicator may include an operation command for writing a value for activation of the notification in a specific resource of a resource group related to the firmware.

Preferably, the information about the resource group(s) supported by the terminal and/or the resource group(s) available to the terminal may be transmitted via a message for update of registered information about the terminal for the server or a message for registration of information about the terminal for the server.

Preferably, the information about the resource group(s) supported by the terminal and/or the resource group(s) available to the terminal may be contained in a specific parameter of the message.

Preferably, when the indicator is not configured, the information about the resource group(s) supported by the terminal and/or the resource group(s) available to the terminal may be periodically transmitted.

In another aspect of the present invention, provided herein is a method for receiving, by a server, notification of change of resource group(s) supported by a terminal due to update of firmware in a wireless communication system, the method including configuring an indicator for indicating the notification, transmitting, to the terminal, an operation command for indicating execution of the update of the firmware, and receiving information about the resource group(s) supported by the terminal and/or resource group(s) available to the terminal when the indicator is configured and the resource group supported by the terminal is changed according to execution of the update.

Preferably, configuring the indicator may include transmitting, to the terminal, an operation command for writing a value for activation of the notification in a specific resource of a resource group related to the firmware.

Preferably, the information about the resource group(s) supported by the terminal and/or the resource group(s) available to the terminal may be received via a message for update of registered information about the terminal for the server or a message for registration of information about the terminal for the server.

Preferably, the information about the resource group(s) supported by the terminal and/or the resource group available to the terminal may be contained in a specific parameter of the message.

Preferably, when the indicator is not configured, the information about the resource group(s) supported by the terminal and/or the resource group(s) available to the terminal may be periodically received.

In another aspect of the present invention, provided herein is a terminal configured to notify change of resource group(s) supported by the terminal due to update of firmware in a wireless communication system, the terminal including a radio frequency (RF) unit, and a processor configured to control the RF unit, wherein the processor is configured to receive, from a server, an operation command for configuring an indicator for indicating the notification, receive, from the server, an operation command for indicating execution of the update of the firmware, and transmit, to the server, information about the resource group(s) supported by the terminal and/or resource group(s) available to the terminal when the indicator is configured, and the resource group(s) supported by the terminal is changed according to execution of the update.

In another aspect of the present invention, provided herein is a server configured to receive notification of change of resource group(s) supported by a terminal due to update of firmware in a wireless communication system, the server including a radio frequency (RF) unit, and a processor configured to control the RF unit, wherein the processor is configured to configure an indicator for indicating the notification, transmit, to the terminal, an operation command for indicating execution of the update of the firmware, and receive information about the resource group(s) supported by the terminal and/or resource group(s) available to the terminal when the indicator is configured and the resource group(s) supported by the terminal is changed according to execution of the update.

The aforementioned technical solutions are merely parts of embodiments of the present invention and various embodiments in which the technical features of the present invention are reflected can be derived and understood by a person skilled in the art on the basis of the following detailed description of the present invention.

Advantageous Effects

According to an embodiment of the present invention, M2M server(s) may be notified of information associated with update of a specific function or resource of an M2M client/device. Thereby, not only the M2M server initiating the update but also other M2M server(s) may recognize update of the specific function or resource of the M2M client/device and use the specific function or resource that is changed through update.

The effects that can be obtained from the present invention are not limited to the aforementioned effects, and other effects may be clearly understood by those skilled in the art from the descriptions given below.

DESCRIPTION OF DRAWINGS

The accompanying drawings, which are intended to provide a further understanding of the present invention, illustrate various embodiments of the present invention and together with the descriptions in this specification serve to explain the principle of the invention. In the drawings:

FIG. 3 illustrates interface models according to an embodiment of the present invention;

BEST MODE

Figure 1:
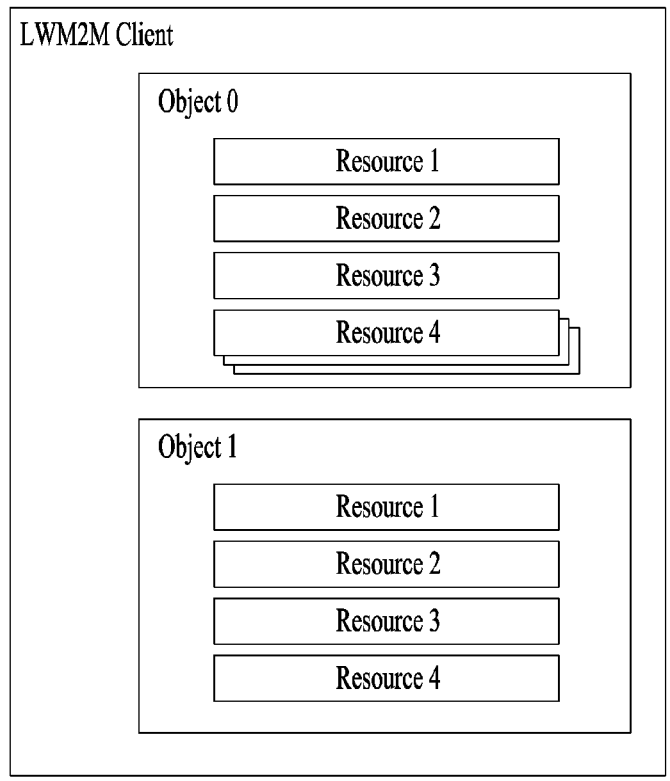
FIG. 1 illustrates a structure of data stored in an M2M client.

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a device for M2M communication, that is, an M2M client or terminal may be fixed or mobile and includes a server for M2M communication, that is, an M2M server or a device which communicates with the server to transmit/receive user data and/or control information. The M2M client may be referred to as terminal equipment, MS (Mobile Station), MT (Mobile Terminal), UT (User Terminal), SS (Subscribe Station), wireless device, PDA (Personal Digital Assistant), wireless modem, handheld device, etc. In addition, the M2M server refers to a fixed station communicating with M2M terminals and/or other M2M servers and exchanges data and control information with M2M terminals and/or other M2M servers by communicating therewith.

A description will be given of the related art.

Device Management

Device management refers to management of device configuration and other managed objects of devices from the point of view of various management authorities. Device management includes, but is not restricted to setting initial configuration information in devices, subsequent updates of persistent information in devices, retrieval of management information from devices and processing events and alarms generated by devices.

Management Tree

Management tree refers to an interface by which a management server interacts with a client, e.g. by storing values in the management tree or retrieving values from the management tree and by manipulating the properties of the management tree, for example, access control lists. In the specification, the term management tree can be used interchangeably with the term device management tree or DM tree.

Management Object (MO)

A management object is a subtree of the management tree which is intended to be a (possibly singleton) collection of nodes which are related in some way. For example, ./Devinfo Nodes form a management object. A simple management object may consist of one single node.)

Device Management (DM) Server

A DM server may be an abstract software component in a deployed device management infrastructure that conforms to OMA device management enabler static conformance requirements specified for DM servers. The DM server serves as an end-point of DM client-server protocols and a DM server-server interface.

In the specification, the DM server may be mounted in a device, computer, etc. including a communication module, a processor module, etc.

Device Management (DM) Client

A DM client may be an abstract software component in a device implementation that conforms to OMA device management Enabler static conformance requirements specified for DM clients. The DM client serves as an end-point of the DM client-server protocols.

In the specification, the DM client may be mounted in a device including a communication module, a processor module, etc., which is an object of DM. The DM client may be implemented as a single device.

Access Control List (ACL)

An ACL refers to a list of DM server identifiers regarding a specific node in a management tree and access rights associated with each identifier.

Node

A Node is a single element in a management tree. There can be two kinds of nodes in a management tree: interior nodes and leaf nodes. The format property of a node provides information about whether the node is a leaf or an interior node.

Interior Node

An interior node is a node that may have child nodes, but cannot store any value allocated to a node, that is, a node value. The format property of an interior node is "node".

Leaf Node

A leaf node can store a node value, but cannot have child nodes. The format property of a leaf node is not "node".

Accordingly, all parent nodes must be interior nodes.

Permanent Node

A permanent node is permanent if the DDF property scope is set to permanent. If a node is not permanent, the node corresponds to a dynamic node. The permanent node cannot be dynamically generated or deleted by a server.

Dynamic Node

A dynamic Node is dynamic if the DDF property scope is set to dynamic or if the scope property is unspecified.

Server Identifier

A server identifier refers to an OMA DM internal name for a DM server. A DM Server is associated with an existing server identifier in a device through OMA DM account.

ACL Properties and ACL Values

All terminals managed by a DM protocol have a single DM tree starting with a root node and the DM protocol performs management of terminals by manipulating each node of the DM tree. For example, to install downloaded software in a terminal, the software can be installed by executing a node "install" matched to the software. Each node may indicate simple information such as a numeral and complicated data such as graphical data or log data. In addition, a node may indicate a command such as "Execute", "Download" or the like.

Each node has properties of providing meta data related thereto. The properties include runtime which refers to duration of a node from generation of the node in the DM tree to extinction of the node. The runtime property includes an ACL, format, name, size, title, Tstamp, type and VerNo.

The ACL is mandatory such that both a terminal and a server need to implement the ACL in DM 1.3 protocol. The ACL specifies DM commands that a specific DM server can execute on a specific node. An unspecified command cannot be executed. In other words, the ACL refers to rights granted to a specific DM server for a specific node. In the DM protocol, the ACL is given to the server identifier of a DM server and is not assigned to a URI, an IP address and a DM server certificate. The server identifier is used as an identifier for authenticating the DM server in the DM protocol. Furthermore, the ACL can be provided as ACL property and an ACL value provided to the ACL property. In the specification, an ACL value may also be referred to as ACL information or information about the ACL. In DM 1.3 protocol, all nodes are defined to have the ACL property. All nodes having the ACL property are defined to have an empty ACL value or a non-empty ACL value.

The ACL has unique properties different from the runtime property. The unique properties include ACL inheritance. ACL inheritance refers to the concept of obtaining an ACL value for a node, which is included in a DM tree and does not have an ACL value, from the ACL value of the parent node of the node. If the parent node also does not have the ACL value, then the ACL value of the parent node is obtained from the ACL value of the parent node of the parent node. Since the root node corresponding to the highest node of the DM tree must have an ACL value in the DM protocol, the ACL value must be inherited. ACL inheritance is performed for all ACL values rather than being performed per DM command. Accordingly, ACL inheritance from the parent node of the node is carried out only when a node has an empty ACL value. That is, if an ACL value of a node specifies only "Add", unspecified "Get" is not inherited.

In the DM protocol, the root node has "Add=*&Get=*" as a basic value for ACL. Here, "*" denotes a wild card and means an arbitrary DM server. To get an ACL value, the DM server uses the "Get" command. The "Get" command regarding ./NodeA/Node1 gets an ACL value of ./NodeA/Node1. To change an ACL value, a "Replace" command is used. When "Replace" is executed on ./NodeA/Node1?prop=ACL" to set "Add=DMS1&Delete=DMS1&Get=DMS1", the ACL value is changed. In the DM protocol, an individual ACL entry cannot be changed and all ACL values can be changed. The right to get and change an ACL value is defined based on ACL. The right for an interior node and the right for a leaf node are differently defined.

Interior node: If the corresponding node has "Get" and "Replace" rights, it is possible to get and replace the ACL value of the corresponding node. "Replace" refers to the right to replace ACL values of all child nodes.

Leaf node: If a parent node of the corresponding node has "Replace" rights, the ACL value of the corresponding node can be replaced. The parent node needs to have "Get" rights in order to get the ACL of the corresponding node. Similarly, if the corresponding node has "Replace" rights, the ACL value of the node can be replaced. To replace the ACL value, the parent node of the corresponding node needs to have "Replace" rights.

The right to replace the ACL value of the corresponding node can be controlled by the ACL value of the parent node of the node irrespective of whether the node is an interior node or a leaf node. If an interior node has "Replace" rights, ACL values of all child nodes as well as the ACL value of the interior node can be replaced. Accordingly, if the root node has "Replace" rights, it is possible to have any right for all nodes in the DM tree. However, even when a parent node has "Replace" rights, specific rights such as "Get" and "Get" are not provided for a child node and right such as "Get" needs to be directly specified for the child node. Accordingly, the ACL value of the child node needs to be corrected prior to execution of a command and the ACL value of the child node is corrected by correcting ACL values of all nodes located before the corresponding child node. This is inconvenient and thus the DM protocol allows the ACL value of a corresponding node to be directly corrected without change of ACL values of intermediate nodes when the parent or ancestor node has "Replace" rights.

When a DM server generates a new node through command "Add", the generated node does not have an ACL value in general and thus gets the ACL value from the parent node thereof. However, when the generated node is an interior node and the parent node thereof does not have "Replace" rights, it is necessary to set the ACL value of the generated node at the same time when the node is generated to provide the right to manage the node.

The syntax for representing ACL values is defined in [DM-TND]. An exemplary ACL value is "Get=DMS1&Replace=DMS1&Delete=DMS2". Here, DMS1 and DMS2 are DM server identifiers and "Get", "Replace" and "Delete" are DM commands. Accordingly, DM server DMS1 can execute "Get" and "Replace" on a corresponding node and DM server DMS2 can execute "Delete" on the corresponding node. Here, Get=DMS1, Replace=DMS1 and Delete=DMS2 are ACL-entries and represent individual command rights of the DM servers. In other words, an ACL value is a set of individual ACL-entries and an ACL value of each node can include at least one ACL-entry.

DDF (Device Description Framework)

DDF is a specification for how to describe the management syntax and semantics for a particular device type. DDF provides information about MO, management functions and DM tree structure of terminals.

DM 1.3 Authentication

DM 1.3 performs authentication based on ACL. DM authentication is performed per DM command. If a DM server has transmitted a plurality of DM commands, a DM client (referred to as a DMC hereinafter) performs authentication prior to execution of the commands and executes only a DM command granted as a result of authentication.

DM Tree

A DM tree refers to a set of MO instances exposed by a DMC. The DM tree functions as an interface by a management server interacting with a client. For example, the management server can store and retrieve specific values from the DM tree and manipulate properties of the DM tree.

To perform communication between a server and a client in a conventional server-client model, information that needs to be shared/stored by the two entities (server and client) prior to communication is present. For this, a DM client is bootstrapped and a DM server or a DM bootstrap server transmits advance information necessary for communication with the DM server in DM. That is, the DM client transmits information necessary for communication with a specific DM server through bootstrapping to enable communication between the DM client and the DM server.

In an actual deployment situation, a DM client may be re-bootstrapped. For example, the DM client is re-bootstrapped when errors are continuously generated in communication between the DM client and a specific DM server. This can occur due to security key mismatch or for other reasons. While DM does not specify re-bootstrap, re-bootstrap is considered to refer to a case in which bootstrap is regenerated. In the case of bootstrap, information regarding a specific server (e.g., authority information of a corresponding server in an ACL) is initialized in addition to bootstrap information and thus it is necessary to transmit information about the corresponding server to a client even after re-bootstrap. Accordingly, the present invention provides a method for performing re-bootstrap while maintaining information using a method of providing/updating only specific information without performing entire bootstrap.

FIG. 1 illustrates a data structure stored in an M2M client. The M2M client (or terminal) may have entities corresponding to groups of resources referred to as "objects" corresponding to functions that can be implemented by the M2M client. An object identifier may be defined in object specification and an identifier that is not defined in the object specification may be set by an operator or manufacturer using the M2M system. A resource is an entity that stores data and may have a plurality of resource instances. Each object is generated and instantiated as an object instance by a specific operation and the M2M client can access the corresponding resource through the object instance.

The "object" is a definition for a group of resources to be used for a specific function (functionality) or purpose, and the "object instance" is an instantiated (created) resource group for the object in a terminal. To use the function of the object, the object instance must be generated.

Specifically, the "object", which conceptually corresponds to a template or blueprint of a resource group to be instantiated, defines resources that the resource group to be instantiated can have, properties (e.g., an identifier, name, supported operation command, range, unit and specification of the resource) that the resources have, and an operation performed according to a specific operation command. The "object instance" is a resource group instantiated or present in the terminal according to the definition of the object. A resource of the resource group may have a corresponding value.

In the descriptions given below, "object" may be interchangeably with "group of supported resource(s)" or "resource group definition", and "object instance" may be used interchangeably with "group of instantiated resource(s)" or "resource group".

In addition, information indicating an operation supported by a resource is included in or added to the resource. There are operations "Read", "Write", "Execute", "Write Attribute", "Discover", "Observe", etc.

Figure 2:
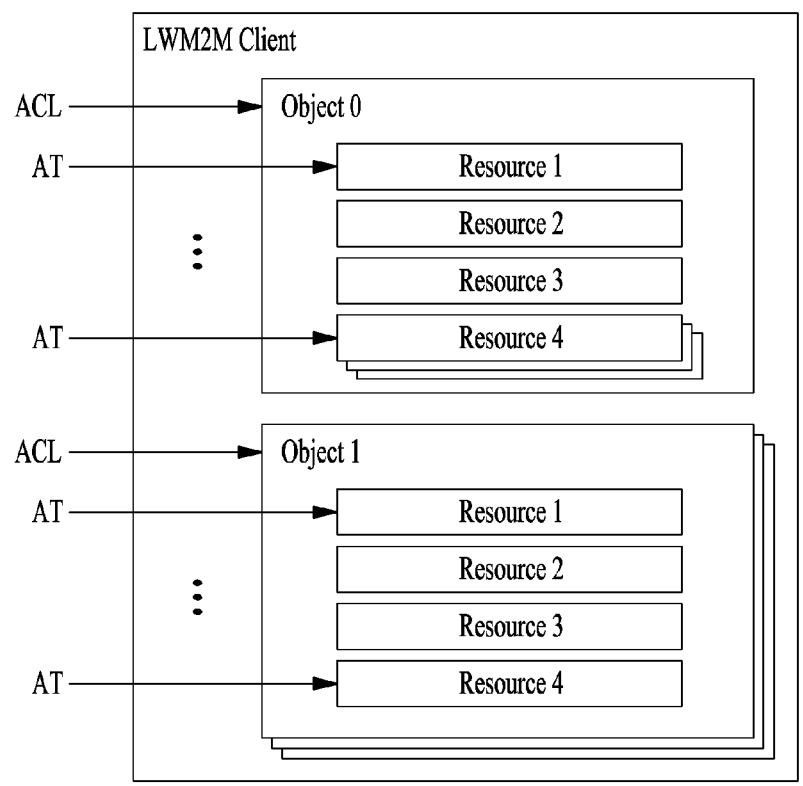
FIG. 2 illustrates a resource model according to an embodiment of the present invention.

FIG. 2 illustrates a resource model according to an embodiment of the present invention. An ACL (Access Control List) and an AT (Access Type) are assigned for control of access rights for resources to be used in the M2M system according to an embodiment of the present invention.

The ACL is assigned per resource corresponding to a specific function, that is, per object instance. Lower resources of each object instance are considered to be allocated the same ACL. That is, since the ACL is assigned per object instance, lower resources of each object instance have the same ACL.

Since an object instance is an entity corresponding to a resource group and is a group for executing a specific function, the same right should be granted for all resources in a group when the right for a specific function is granted for a specific server. When the same right is not granted, operation can be partially performed for a function. In this case, the function of the server becomes ambiguous and the meaning of granting authority is unclear. Accordingly, in an embodiment of the present invention, an ACL is assigned per object instance, as described above, to reduce overhead, compared to storage per resource, and to simplify an access right authentication procedure by using the same mechanism to find an ACL.

For reference, each object may be instantiated as a plurality of object instances.

The AT can be assigned per resource and define an access scheme supported by each resource. For example, when an access scheme is defined as operations, the AT can be defined as specific operations, for example, "Read", "Write" and "Execute".

The ACL and AT may be referred to by different terms. For example, the ACL can be referred to as access right and the AT can be referred to as a supportable operation.

Interface

A description will be given of an interface through which specific operations are transmitted between a server and a client (terminal) prior to description of embodiments of the present invention.

Four interfaces related to the present invention are present: 1) bootstrap, 2) device (client) registration, 3) device management and service enablement and 4) information reporting. Operations for the four interfaces can be classified into uplink operations and downlink operations. Operations of the interfaces are shown in the following table.

TABLE 1

| Interface | Direction | Logical Operation |
| --- | --- | --- |
| Bootstrap | Uplink | Request Bootstrap |
| Bootstrap | Downlink | Write, Delete |
| Device(Client) Registration | Uplink | Register, Update, De-register |
| Device Management and Service Enablement | Downlink | Read, Create, Delete, Write, Execute, Write Attribute, Discover |
| Information Reporting | Downlink | Observe, Cancel Observation |
| Information Reporting | Uplink | Notify |

FIG. 3 illustrates the four interfaces. FIG. 3(a) illustrates an operation model for the bootstrap interface. For the bootstrap interface, operations include an uplink operation (i.e. client initiated bootstrap) called "Request bootstrap" and downlink operations (i.e. server initiated bootstrap) called "Write" and "Delete". These operations are used to initiate objects necessary for a client to register with one or more servers. Bootstrap is defined using a factory bootstrap (stored in a flash memory, for example) or a bootstrap (stored in a smart card) from the smart card.

FIG. 3(b) illustrates an operation model for "device (client) registration" interface. For the device registration interface, uplink operations called "Register", "Update" and "De-register" are present. "Register" is used to register information of a client in a server and "Update" is used to update the information or state of the client, registered in the server, periodically or according to an event generated in the client. "De-register" is operation of cancelling registration of the client with the server and the server can delete the information of the client according to "De-register".

FIG. 3(c) illustrates an operation model for the "device management and service enablement" interface. For the "device management and service enablement" interface, downlink operations called "Read", "Create", "Write", "Execute", "Write Attribute" and "Discover" are present. These operations are used for interaction with resources, resource instances, objects and object instances of the client. "Read" operation is used to read the current values of one or more resources, "Write" operation is used to update values of one or more resources and "Execute" operation is used to initiate operation defined by a resource. "Create" and "Delete" operations are used to create and delete object instances. "Write Attribute" is used to set an attribute related to "Observe" operation and "Discover" is used to discover the corresponding attribute.

FIG. 3(d) illustrates an operation model for the "information reporting" interface. For the information reporting interface, downlink operations called "Observe" and "Cancel observation" and an uplink operation called "Notify" are present. The information reporting interface is used to transmit a new value related to a resource on the client to the server. "Observe" is used for the server to observe a specific resource when the server is interested in resource change and "Cancel observation" is used when the corresponding observation is no longer performed (when the server no longer wishes to know about resource change). "Notify" is used to notify the server of observation condition attributes set through "Write Attribute" when the observation condition attributes are satisfied.

Data Model for Access Control

To reduce parsing process overhead and space overhead of an M2M device, server identifiers (IDs), ACL (or access right) and AT (or supportable operation) suitable for M2M environments are modeled.

Short Server ID

Information that needs to be included in an ACL must include information on a server and operations that the server can instruct. Server ID may be considerably long since the server ID is represented by a URI in general. Since an ACL needs to be represented per object instance and a long server ID is repeatedly used for object instances, the server ID may cause considerable space overhead depending on the number of object instances. Accordingly, the present invention proposes use of a short server ID having a fixed length (e.g. 2 bytes) for an ACL. The M2M client stores mapping relationship between short server IDs and server IDs and can find a short server ID corresponding to a server ID for an operation received from the server corresponding to the server ID and perform authentication through the corresponding ACL using the short server ID.

TABLE 2

| Identifier | Semantics | Description |
|---|---|---|
| Short Server ID | 16-bit unsigned integer | Short integer ID allocated by a bootstrap server. This identifier uniquely identifies each M2M server configured for the M2M client. |

Access Control List (ACL) or Access Right

An ACL is allocated per object instance and corresponds to a list of ACL entries that designate access right for M2M servers. An ACL entry can be represented by a short server ID and access right of the corresponding server. A short server ID and an access right value are set to fixed short lengths to improve space overhead and processing efficiency during an authentication procedure. With regard to access right, a single bit value is allocated per M2M operation such that a specific operation is authenticated by reading only a single bit value to thereby improve processing efficiency. Default ACL entries for servers other than servers on the ACL can be set, and the M2M client can find a specific short server ID (e.g. 0x0000) when receiving operations with respect to all servers which are not on the ACL and authenticate the operations using the corresponding access right.

TABLE 3

| Field | Description |
|---|---|
| ACL | List of ACL entries |
| ACL entry | Composed of a short server ID and access right<br>Access right is composed of<br>$1^{st}$ lsb (least significant bit): Read<br>$2^{nd}$ lsb: Write |

TABLE 3-continued

| Field | Description |
|---|---|
| | $3^{rd}$ lsb: Execute<br>Other bits are reserved for future use. |

The ACL entry shown in Table 3 is exemplary and can be set to different values.

Access Type (AT) or Supportable Operations

AT can designate operations supported by resources. One bit is mapped to one operation in the same manner as access right of ACL entry.

TABLE 4

| Field | Description |
|---|---|
| Access Type | $1^{st}$ lsb: Read<br>$2^{nd}$ lsb: Write<br>$3^{rd}$ lsb: Execute<br>Other bits are reserved for future use |

Access type shown Table 4 is exemplary and can be set to different values.

A brief description will be given of operations and objects (instances) described in the aforementioned embodiments and used in the specification.

Register

Registration is performed when an M2M client transmits an operation command "Register" to an M2M server. When the M2M device is turned on and the bootstrap procedure is completed, the M2M client should execute the operation command "Register" for each M2M server (i.e., each server with which the M2M client registers) corresponding to a server object instance of the M2M client. The following table describes parameters used for the operation command "Register".

TABLE 5

| Parameter | Required | Default Value | Notes |
|---|---|---|---|
| Endpoint Client Name | Yes | | Identifies the LWM2M Client on one LWM2M Server (including LWM2M Bootstrap Server).<br>Provided to the LWM2M Server during Registration, also provided to LWM2M Bootstrap Server when executing the Bootstrap procedure.<br>Endpoint Client Name. |
| Lifetime | No | 86400 | If Lifetime Resource does not exist in a LWM2M Server Object Instance, the Client MUST NOT send this parameter and the Server MUST regard lifetime of the Client as 86400 seconds. The registration SHOULD be removed by the Server if a new registration or update is not received within this lifetime. |
| LWM2M Version | No | 1.0 | Indicates the version of the LWM2M Enabler that the LWM2M Client supports. This parameter is required only for LWM2M versions >1.0. |
| Binding Mode | No | U | Indicates current binding and Queue mode of the LWM2M Client. "U" means UDP binding, and "S" means SMS binding. The "Q" can be appended to represent the binding works in the Queue mode.<br>For example, "UQS" means the Client uses both the UDP binding with Queue Mode enabled and the SMS binding with Queue Mode disabled. |
| SMS Number | No | | The value of this parameter is the MSISDN where the LWM2M Client can be reached for use with the SMS binding. |
| Objects and Object Instances | Yes | | The list of Objects supported and Object Instances available on the LWM2M Client. |

Update

Initiated periodically, or based on specific events in the M2M client, or by the M2M server, the M2M client may transmit the operation command "Update" to the M2M server, thereby updating the registered information therein and the registered information in the M2M server. The operation command "Update" should contain only changed parameters listed in the following table with respect to the last registered parameters transmitted to the M2M server.

If the M2M client uses UDP binding for communication with the M2M server and changes in the IP address or port of the M2M client, the M2M client must transmit the operation command "Update" to the M2M server.

TABLE 6

| Parameter | Required |
|---|---|
| Lifetime | No |
| Binding Mode | No |
| SMS Number | No |
| Objects and Object Instances | No |

The operation command "Update" may be initiated by the M2M server via the operation command "Execute" for the "Registration Update Trigger" resource of the M2M server object.

De-Register

When it is determined that the M2M client is not available to the M2M server anymore (e.g., M2M device operation reset), the M2M client must transmit the operation command "De-register" to the M2M server. Upon receiving this operation command, the M2M server should remove the registration information about the M2M client therefrom.

Read

"Read" operation is used to access (read) values of individual resources, resource instances of an array, object instances or all object instances of an object and has the following parameters.

TABLE 5

| Parameter | Required | Default Value | Notes |
|---|---|---|---|
| Object ID | Yes | — | Indicates the object. |
| Object Instance ID | No | — | Indicates the object instance to read. If no object instance ID is indicated, then the object instances of objects, which the server is authorized to, are returned. |
| Resource ID | No | — | Indicates the resource to read. If no resource ID is indicated, then the whole object instance is returned. |

Discover

"Discover" operation is used to discover individual resources, object instances and attributes (parameters) set for an object. "Discover" operation can be used to discover resources implemented in an object. Returned values correspond to a list of application/link-format CoRE Links (conform to application/link-format CoRE Links format of RFC6690) for each resource including attributes of the resource. "Discover" operation has the following parameters.

TABLE 6

| Parameter | Required | Default Value | Notes |
|---|---|---|---|
| Object ID | Yes | — | Indicates the object. |
| Object Instance ID | No | — | Indicates the object instance. |
| Resource ID | No | — | Indicates the resource. |

As specific functions of "Discover" operation, information on which resource is implemented and observe parameters configured to objection is returned when only the object ID from among the aforementioned parameters is specified, observe parameters set for a specified object instance can be returned when the object ID and the object instance ID from among the parameters are specified, and observe parameters set for a specific resource can be returned when the object ID, object instance ID and resource ID from among the parameters are specified.

Write

"Write" operation is used to change (write) a plurality of resource values in a resource, resource instances of an array or an object instance. "Write" operation permits a plurality of resources in the same object instance to be changed according to one command. That is, "Write" operation can access object instances (as well as individual resources). "Write" operation has the following parameters.

TABLE 7

| Parameter | Required | Default Value | Notes |
|---|---|---|---|
| Object ID | Yes | — | Indicates the object. |
| Object Instance ID | Yes | — | Indicates the object instance to write. |
| Resource ID | No | — | Indicates the resource to write. The payload is the new value for the resource. If no resource ID is indicated, then the included payload is an object instance containing the resource values. |
| New Value | Yes | — | The new value included in the payload to update the object instance or resource. |

Write Attributes

"Write attributes" operation is used to change (write) attributes of a resource or an object instance. "Write attributes" operation has the following parameters.

TABLE 8

| Parameter | Required | Default Value | Notes |
|---|---|---|---|
| Object ID | Yes | — | Indicates the object. |
| Object Instance ID | Yes | — | Indicates the object instance to write attributes. |
| Resource ID | No | — | Indicates the resource to write attributes. |
| Minimum Period | No | 1 | When present, the minimum period indicates the minimum time in seconds the client should wait from the time when sending the last notification to the time when sending a new notification. In the |

TABLE 8-continued

| Parameter | Required | Default Value | Notes |
|---|---|---|---|
| | | | absence of this parameter, the minimum period is defined by the default minimum period set in the LWM2M server object instance related to that server. |
| Maximum Period | No | — | When present, the maximum period indicated the maximum time in seconds the client should wait from the time when sending the last notification to the time sending the next notification (regardless if the value has changed). In the absence of this parameter, the maximum period is up to the server. The maximum period must be greater than the minimum period parameter. In the absence of this parameter, the maximum period is defined by the default maximum period set in the LWM2M server object instance related to that server. |
| Greater than | No | — | When present, the client should notify its value when the value is above the number specified in parameter. |
| Less than | No | — | When present, the client should notify its value when the value is below the number specified in the parameter. |
| Step | No | — | When present, the client should notify its value when the value is changed more than the number specified in the parameter from the resource value when the client receives the observe operation.. |

The parameters "minimum period", "maximum period", "greater than", "less than" and "step" are only used in "Observe" operation. The parameters "maximum period" and/or "minimum period" are used to control how often "Notify" operation is transmitted by the M2M client for an observed object instance or resource. The parameters "greater than", "less than" and "step" are valid only when the resource ID is indicated. The parameters "greater than", "less than" and "step" need to be supported only when the resource type is number (e.g. integer, decimal).

Execute

"Execute" operation is used by the M2M server to initiate an operation and can be performed only for individual resources. The M2M client returns error when "Execute" operation is received for object instances or resource instances. "Execute" operation has the following parameters.

TABLE 9

| Parameter | Required | Default Value | Notes |
|---|---|---|---|
| Object ID | Yes | — | Indicates the object. |
| Object Instance ID | Yes | — | Indicates the object instance. |
| Resource ID | Yes | — | Indicates the resource to execute. |

Generate

"Generate" operation is used by the M2M server to generate an object instance in the M2M client. "Generate" operation needs to target one of an object instance or object that is not instantiated.

An object instance generated in the M2M client by the M2M server should be of an object type supported by the M2M client and of an object instance which is notified by the M2M client to the M2M server using "Register" and "Update" operations of the device registration interface.

An object that supports at most one object instance should be allocated an object instance ID of 0 when the object instance is generated. "Generate" operation has the following parameters.

TABLE 10

| Parameter | Required | Default Value | Notes |
|---|---|---|---|
| Object ID | Yes | — | Indicates the object. |
| Object Instance ID | No | — | Indicates the object instance to create. If this resource is not specified, the client assigns the ID of the object instance, which has not been used. |
| New Value | Yes | — | The new value included in the payload to create the object instance. |

Delete

"Delete" operation is used for the M2M server to delete an object instance in the M2M client. The object instance deleted from the M2M client by the M2M server should be an object instance that is notified to the M2M server by the M2M client using "Register" and "Update" operations of the device registration interface. "Delete" operation has the following parameters.

TABLE 11

| Parameter | Required | Default Value | Notes |
|---|---|---|---|
| Object ID | Yes | — | Indicates the object. |
| Object Instance ID | Yes | — | Indicates the object instance to delete. |

Observe

The M2M server can initiate observation request for changes in a specific resource in the M2M client, resources in an object instance or all object instances of an object. Related parameters for "Observe" operation are set by "Write Attributes" operations. "Observe" operation includes the following parameters.

TABLE 12

| Parameter | Required | Default Value | Notes |
|---|---|---|---|
| Object ID | Yes | — | Indicates the object. |
| Object Instance ID | No | — | Indicates the object instance to observe. If no object instance ID is indicated, then all the object instances of objects are observed and resource ID must not be specified. |
| Resource ID | No | — | Indicates the resource to observe. If no resource ID is indicated, then the whole object instance is observed. |

Cancel Observe

"Cancel Observe" operation is transmitted from the M2M server to the M2M client to cancel observation for an object instance or a resource. "Cancel Observe" operation has the following parameters.

TABLE 13

| Parameter | Required | Default Value | Notes |
|---|---|---|---|
| Object ID | Yes | — | Indicates the object. |
| Object Instance ID | No | — | Indicates the object instance to stop observing. If no object instance ID is indicated, then object ID is indicated and resource ID must not be specified. |
| Resource ID | No | — | Indicates the resource to stop observing. If no resource ID is indicated, then the whole object instance is indicated. |

Access Control Method

A description will be given of an access control method according to another embodiment of the present invention.

Access Right Acquisition

When the M2M client has an M2M server object instance, the M2M client has the rights to access corresponding resources without undergoing access control for the corresponding single M2M server, that is, without checking the access control object instance.

If the M2M client has two or more M2M server object instances, then the M2M client finds the ACL of a corresponding server with respect to an object instance to be accessed or an object instance including a resource to be accessed in access control object instances. If the ACL includes the access right corresponding to the corresponding M2M server ID, then the corresponding M2M server has the access right. If the ACL entry of the corresponding M2M server ID is not present, the M2M client checks whether the ACL includes access right allocated to a default server ID. When the default server ID is present, the corresponding M2M server has access right of the default server ID. When the access right corresponding to the M2M server ID and the access right of the default server ID are not present, the corresponding M2M server does not have the right to access the corresponding object instance or resource.

Access Control Object

An access control object is used to check whether an M2M server has the access right to perform operations. Each access control object instance includes an ACL for a specific object instance in the M2M client.

TABLE 14

| Resource Name | Resource ID | Supported Operations | Multiple Instances? | Mandatory? | Data Type | Range or Enumeration | Units | Descriptions |
|---|---|---|---|---|---|---|---|---|
| Object ID | 0 | R | Single | Mandatory | Integer | 1-65534 | — | The Object ID and the Object Instance ID are applied for |
| Object Instance ID | 1 | R | Single | Mandatory | Integer | 1-65535 | — | LWM2M identifiers. |
| ACL | 2 | R, W | Multiple | Optional | Integer | 8-bit | — | Resource instance ID must be the short server ID of a certain LWM2M server which has an access right. Resource instance ID 0 is for default short server ID. Setting each bit means the LWM2M server has the access right for that operation. The bit order is specified as below. $1^{st}$ lsb: Read, Observe, Discover, Write Attributes $2^{nd}$ lsb: Write $3^{rd}$ lsb: Execute $4^{th}$ lsb: Create $5^{th}$ lsb: Delete Other bits are reserved for future use |
| Access Control Owner | 3 | R, W | Single | Mandatory | Integer | 1-65365 | — | Short server ID of a certain LWM2M server. Only this LWM2M server can manage these resources of the object instance. Value MAX_INTEGER=0xFFFF is reserved for the access control object instances created during bootstrap procedure. |

Authentication Procedure

To pass an authentication procedure for an operation transmitted from an M2M server, the following needs to be satisfied. First, the M2M server needs to have the right (i.e. access right) to perform the operation transmitted for a corresponding resource (e.g. object instance or resource). Secondly, the corresponding resource needs to support the transmitted operation. An access right authentication procedure according to an embodiment of the present invention is performed through two steps, that is, in a hierarchical structure.

The M2M client notifies the M2M server that the transmitted operation is not performed due to a certain resource by transmitting an error message to the M2M server when the right to access the corresponding resource is not present and by transmitting information about the corresponding resource to the M2M server when the corresponding resource does not support the operation. The authentication procedure is differently performed for three levels, that is, a resource, an object instance and an object.

Operation for a Resource

If the M2M server accesses an individual resource, that is, the M2M server transmits an operation with respect to the individual resource to the M2M client, then the M2M client can acquire the access right of the M2M server for an object instance including the individual resource according to the aforementioned access right acquisition method and check whether the access right is granted to perform the operation.

When the operation is not granted, the M2M client needs to transmit an error code indicating "grant of access right is rejected" to the M2M server.

When the operation is granted, the M2M client verifies whether the individual resource supports the operation.

If the operation is not supported by the individual resource, then the M2M client needs to transmit an error code indicating "operation is not supported" to the M2M server.

When the operation is supported by the individual resource, the M2M client can perform the operation.

Operation for an Object Instance

When the M2M server accesses an object instance, that is, the M2M server transmits an operation with respect to the object instance to the M2M client, the M2M client can acquire the access right of the M2M server for the object instance according to the aforementioned access right acquisition method and check whether the access right is granted to perform the operation.

When the operation is not granted, the M2M client needs to transmit an error code indicating "grant of access right is rejected" to the M2M server.

When the operation is granted, the M2M client can perform the following processes based on the operation.

For "Write" operation, the M2M client can perform the operation with respect to the object instance only when all resources with respect to the transmitted operation support "Write" operation. If any resource (with respect to the transmitted operation) does not support "Write" operation, then the M2M client can notify the M2M server of resources that do not support the operation by transmitting an error code indicating "operation is not supported" to the M2M server.

For "Read" operation, the M2M client can retrieve all resources other than resources that do not support "Read" operation and transmit information about the retrieved resources to the M2M server.

For "Create" operation, the M2M client can perform the operation with respect to the object instance only when all resources with respect to the transmitted operation support "Write" operation and all mandatory resources are specified. If any resource (with respect to the transmitted operation) does not support "Write" operation, then the M2M client can transmit an error code indicating "operation is not supported" to the M2M server to notify the M2M server of resources that do not support the operation. When all mandatory resources are not specified, the M2M client can transmit error code "Bad Request" to the M2M server.

For "Delete", "Observe", "Write Attribute" or "Discover" operation, the M2M client needs to perform the operation. That is, the M2M client needs to perform "Delete", "Observe", "Write Attribute" or "Discover" operation without checking whether the operation with respect to the object instance is supported by all resources belonging to the object instance.

For an operation other than the aforementioned operations, the M2M client need not perform the operation and needs to transmit an error code of "operation is not supported" to the M2M server, Whether the M2M server has the access right for the object instance is determined through the aforementioned access right acquisition method. Then, whether individual resources belonging to the object instance support the operation is checked. This process is performed depending upon the operation type.

Operation for an Object

Operations for objects are defined according to operation type.

When the M2M server transmits "Read" operation through an object, that is, the M2M server transmits "Read" operation with respect to the object to the M2M client, the M2M client can collect information on object instances for which the M2M server has the access right from among (lower) object instances belonging to the object and transmit the collected information to the M2M server. Whether the M2M server has the access right is determined according to the aforementioned access right acquisition method.

The information on the object instances for which the M2M server has the access right refers to information on resources searched by the M2M client except for resources that do not support "Read" operation.

When the M2M server transmits "Create" operation through an object, that is, the M2M server transmits "Create" operation with respect to the object to the M2M client, the M2M client can check whether the M2M server has the access right for the object according to the aforementioned access right acquisition method.

When the M2M server has the access right for the object, the M2M client can perform the operation only when all resources transmitted according to the operation support "Write" operation and all mandatory resources are specified. If any resource (with respect to the transmitted operation) does not support "Write" operation, the M2M client can notify the M2M server of resources that do not support the operation by transmitting error code of "operation is not supported" to the M2M server. If all mandatory resources are not specified, the M2M client can transmit error code "Bad Request" to the M2M server. That is, the M2M client notifies the M2M server that the operation according to the M2M server is incorrect.

In the case of "Discover" operation, the M2M client needs to perform the operation. That is, the M2M client does not check whether the M2M server has the access right for all lower object instances of the corresponding object and does not check whether all resources belonging to the object instances support "Discover" operation.

In the case of "Observe" or "Write Attributes" operation, the M2M client needs to perform the operation. That is, for "Observe" or "Write Attributes" operation, the M2M client does not check whether the M2M server has the access right for all lower object instances of the object and whether all resources belonging to the object instances support "Observe" or "Write Attributes" operation.

For an operation other than the aforementioned operations, the M2M client should not perform the operation and can transmit an error code of "operation is not supported" to the M2M server.

Whether the M2M server has the access right for the object is determined through the aforementioned access right acquisition method according to a specific operation for the object. Then, whether individual resources belonging to object instances of the object support the operation is checked. This process is performed depending upon the operation type. For a specific operation with respect to the object, whether the M2M server has the access right and whether the specific operation is supported may not be checked.

Announcement (Notification) of Firmware/Software Change

Figure 4:
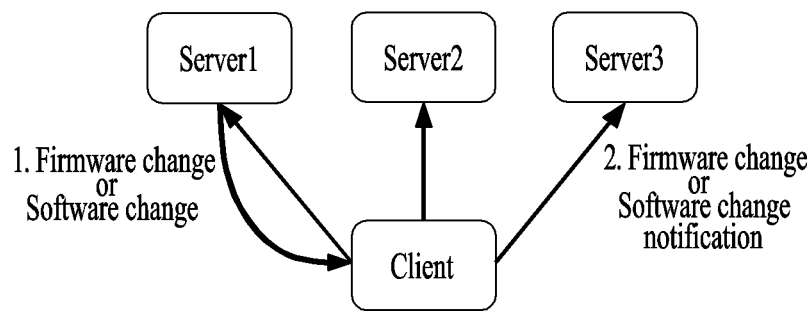
FIG. 4 illustrates the concept of notification triggered by update of firmware or software according town embodiment of the present invention.

According to one embodiment of the present invention, the M2M client notifies changed information thereof according to change (e.g., update, installation, deletion, etc.) of firmware or software to one or more M2M servers with which the M2M client has registered or is connected. FIG. 4 illustrates this operation according to one embodiment.

Referring to FIG. 4, Server 1 may indicate change of the firmware or software to the client. This operation may be performed by transmitting the operation command "Execute" described above. For example, this operation may be performed by making a request to the client for execution of a specific resource (e.g., an update resource) of an object instance related to the firmware or software. Additionally, the authentication procedure for the operation command is performed as described above. For simplicity, the authentication procedure will not be described in this embodiment.

When the authentication procedure for the operation command "Execute" is completed, the client implements the operation command "Execute". Thereby, the firmware or software may be changed. Once the firmware or software is changed, the client may notify each M2M server of information on the change using the operation command "Update" or "Register" via the device registration interface described above. A more detailed description of this notification will be given below.

Notification Target

The target of notification may be an M2M server which is establishing the current access or session with the M2M client or all M2M servers listed in the M2M server account in the M2M client. In case that the information is transmitted to an M2M server that is not establishing the current access or session with the M2M client, the M2M server that is not establishing the current access or session is allowed to recognize, through the notification, that a function supported by the M2M client has changed due to change of the firmware or software of the M2M client, such that the M2M server can use the changed function.

Alternatively, the target of the notification may be pre-specified for each M2M client, and each M2M client may deliver the notification to the specified target of notification. The notification target is not limited to M2M servers. The M2M client may have connection-related information (e.g., an identifier, an address) on the notification target, which may be another entity (e.g., an application) that can establish connection with the M2M client.

Alternatively, the operation command "Update" or "Register" may be transmitted to an M2M server with which the M2M client has registered to deliver the notification.

Notification Indicator

Delivery or transmission of the notification may be performed only when an indicator for the notification (hereinafter, a notification indicator) is configured. In this case, the notification may be performed only if the value of the notification indicator indicates activation of the notification. Otherwise, the notification may not be performed. The notification indicator may be set to a value of an update or registration indicator resource existing in an update object related to the firmware or software.

Alternatively, when firmware or software is changed, notification of the change may be performed 1) if a function supported by the M2M client is changed, 2) if the M2M client determines that the changed function is important, or 3) if the M2M server satisfies a predetermined condition.

In other words, the M2M client may transmit the operation command "Update" or "Register" to the M2M server if the notification indicator is set to a specific value and a supported function (i.e., a supported object) is changed according to change of the firmware or software.

The notification indicator is set by the M2M server. This setting may be performed by recording a specific value in a specific resource corresponding to the notification indicator through the operation command "Write". The M2M client retrieves the set value (through, for example, the operation command "Read") and performs a corresponding operation. The value of the notification indicator may not be set. In this case, a default value may exist, and thus the M2M client may recognize that the notification indicator is set to the default value.

Notification Time

In delivering or transmitting the notification, the M2M client may transmit the notification immediately upon change of the firmware or software or as soon as possible.

Additionally, the M2M client may periodically transmit the operation command "Update" to the M2M server. To notify change of the firmware or software even at a time out of the period of transmission of the operation command "Update", the M2M client may transmit the operation command "Update" or "Register" to the M2M server.

Alternatively, a time for the notification may be preset or contained in the operation command for updating the firmware or the software. Thereby, the M2M client may transmit the notification at the corresponding time. Alternatively, the M2M client may transmit the notification at a selected time within a specific duration.

Notification Content

Method 1

The M2M client may inform the M2M servers of functions or objects (or object instances) (hereinafter, simply referred to as "functions (functionality)") supported or available according to firmware or software change. The supported or available functions may include all functions supported by or available to the M2M client, or may consist of new functions which are supported or available according to the firmware or software change. That is, the M2M client may inform the M2M servers of a list of functions which the M2M client supports and/or a list of newly supported or available functions according to the firmware or software change via the operation command "Update"/the operation command "Register".

Method 2

The M2M client may inform the M2M server of change of firmware or software. Then, the M2M server may retrieve the supported or available functions of the M2M client, thereby acquiring corresponding information. In other words, the M2M server may retrieve a list of functions supported by or available to the M2M client. All M2M servers receiving the notification through access control may retrieve the list, or only a few M2M servers may retrieve the list.

Function Deletion

A specific function may be added or deleted through firmware change or software change. When a function is deleted, a relevant data structure is also deleted. The data structure related to the deleted function may be deleted by a M2M server having received a notification according to firmware change or software change or by the M2M client. In this case, a data structure associated with the deleted data structure is also deleted. For example, the M2M client deletes an object instance related to the deleted function (object), and an access control object instance associated with the object.

Functions Available to M2M Server

Functions available to the M2M server may be preconfigured in a specific M2M client. In this case, the M2M server may compare a set of available functions with a set of functions supported by the M2M client and derive actually available functions from the intersection of the two sets. If the M2M server accesses a function which is not in the intersection of the two sets, an error occurs.

An object creatable by the M2M server may be configured in the M2M server account of the M2M client. In this way, a list of objects creatable for the M2M client by the M2M server is derived from comparison (intersection) between a list of objects creatable by the M2M server and a list of supported objects of the M2M client. If creation of an object that is not explicitly stated in the list is attempted, an error may occur and an object that is explicitly stated in the list may be created by the M2M server.

In addition, a wildcard may be put in an object creatable in the M2M server account by the M2M server, which means that the M2M server has a right to create all objects of the M2M client. In conventional cases, to have a right for a newly added function (Object), a configuration of changing ACL for the newly added function is required. Moreover, to have a right to generate the function, bootstrapping is needed, which is inconvenient. If the wildcard is inserted, however, a right to generate a function to be used in future is granted. Use of such function is facilitated when there exists an M2M server having the highest authority.

Available Functions Subscription

The M2M server may configure a subscription to announce change of available functions in the M2M client. That is, if an available function in the M2M client is changed, M2M servers subscribing to the function may obtain a result of change. Since subscription is performed by the M2M servers when the M2M servers need to obtain notification of change of an available function, only the M2M servers subscribing to the function may obtain a corresponding result value. A filter for the subscription may exist. The filter may provide a function to notify addition/change of a specific function, specific function classification, or a function corresponding to a function identifier range. The target of the subscription may be set to a specific URI (URL). Thereby, a server may recognize functions changed by firmware or software update (e.g., application update). If new functions are discovered without subscription, the functions may be transmitted to all connected (registered) servers.

Further, if a specific time period is preset or contained in a subscription request message, the M2M client may transmit notification of the changed function to the M2M server within the specific time period. Alternatively, the M2M client may transmit the function notification at a selected time within the specific time period.

Figure 5:
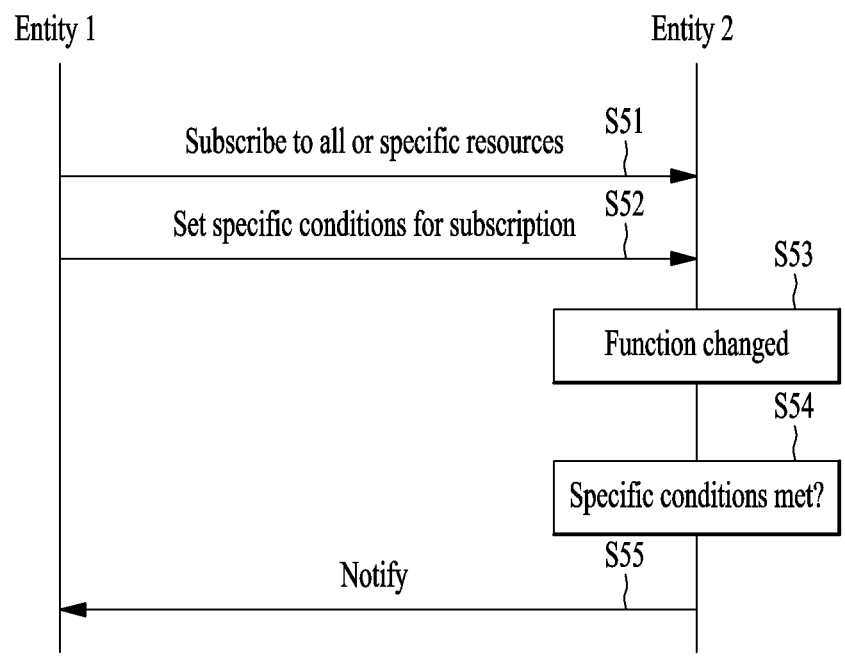
FIG. 5 is a flowchart illustrating a subscription function according to an embodiment of the present invention.

FIG. 5 is a flowchart illustrating a subscription-related procedure according to an embodiment of the present invention.

Entity 1 may perform subscription to Entity 2 in order to check whether a supported resource or resource group (hereinafter, simply referred to as "supported resource" in relation to FIG. 5) in Entity 2 has changed (S51). Herein, the subscription may be set to a default for all resources or a specific resource. Meanwhile, in the description related to FIG. 5, the term "supported resource" may be replaced by other terms. For example, the term "supported resource" may be replaced by a term meaning not only the supported resource or supported resource group but also all information related to definition of a resource or resource group such as a supported resource type or supported attribute and function changes.

Entity 1 may set specific conditions for subscription for notification of the change (S52). That is, only when the specific conditions are met may notification of the change be implemented. Setting the specific conditions may be referred to as setting filtering or a filter.

Meanwhile, S52 may be performed prior to S51, or S51 and S52 may be performed simultaneously. In S51 and S52, setting subscription and filtering may be performed by creating a specific resource associated with the "supported resource" and writing (creating) a specific value or changing the value of the specific resource.

The "supported resource" of Entity 2 for which subscription is set is assumed to have been changed (S53). Entity 2 may check whether the specific conditions set in S52 are met (S54). If the specific conditions are met, Entity 2 may notify change of the "supported resource" to Entity 1 (S55).

According to another embodiment of the present invention relating to FIG. 5, subscription may be performed for a specific function or capability (hereinafter, referred to as "function") of Entity 2 in place of the "supported resource". In this case, the message for subscription to an instantiated resource for change in the terminal and the message for subscription to the "function" for change may be of different types. Even if the messages target the same object, Entity 2 is capable of distinguishing between the two messages. The two messages may be distinguished through a query string.

In addition, for the "function", a specific operation command (e.g., Create, Read, Update, Delete, etc.) may not be executed or only some operation commands may be executed. The specific operation command for the "function" is executed in a different manner over an operation command for the instantiated resource in the terminal. Accordingly, the messages preferably contain information (e.g., an indicator) for indicating whether the subscription is intended for the resource or the function.

More specifically, the message for subscription to the "function" for change may include an identifier for identifying a resource type name or resource type. For subscription to an attribute for change, the message may include an attribute name.

The message for subscription to the resource for change may not include an identifier for identifying a resource type name or resource type.

For example, when Entity 1 transmits an operation command "Retrieve" targeting the resource type of Entity 2, Entity 2 may transmit, via a response message, information indicating that a resource type is supported or a list of functions supported by the resource type to Entity 1 if the resource type is supported. If the resource type is not supported, Entity 2 may transmit, to Entity 1, information indicating that the resource type is not supported (or found) via a response message. Further, in the case where Entity 1 transmits the operation command "Retrieve" targeting the resource type of Entity 2, Entity 2 may transmit, to Entity 1, information indicating that an attribute is supported via a response message when the attribute is supported. If the attribute is not supported, Entity 2 may deliver, to Entity 1, information indicating that the attribute is not supported (or found) via a response message.

The operation command "Retrieve" for the resource type may include an identifier for identifying a resource type name or resource type.

When the operation command "Retrieve" is transmitted for an instantiated resource of the resource type, actual values of the resource and the attribute may be transmitted via a response message. The operation command "Retrieve" may not include the identifier for identifying the resource type name or resource type. The other operation commands may not be used for the resource type.

"Function"

The "function" may be expressed by indicating whether or not a resource type or attribute is supported. That is, if an entity provides a certain function, this may mean that the entity supports a specific resource type or attribute and does not support a function that is not known to the other entities through a resource type or attribute. Specifically, if a response to an operation command transmitted for a corresponding resource type or attribute of Entity 2 from Entity 1 includes information indicating that the resource type or attribute is not supported or found (in, for example, a response code), this means that the resource type or attribute is not supported for Entity 2 and that the function provided by the resource type or attribute is not supported. If the response contains information (e.g., supportability of a function, existence of the function or information related to the function) different from the aforementioned information, this means that the resource type or attribute is supported in Entity 2, and that Entity 2 has the function provided by the resource type or attribute.

The resource type literally indicates a type of a resource. Each type has a set of specific (child) resource types or attributes. A resource type corresponds to the concept of a template or a frame. A resource type or attribute group belonging to a resource type is not given a value. The resource or attribute group of the instantiated resource type may have a value, and an operation command (i.e., Read, Update, Delete, etc.) may be executed for the resource or attribute group or each resource or attribute only when the resource type is instantiated by the operation command "Create".

A resource type may include (child) resource types and attributes, and an operation command to be executed may be preset for every resource type, child resource type and attribute.

In FIG. 5, Entity 1 is an application entity (AE) or common services entity (CSE), and Entity 2 is a CSE. Entity 1 and Entity 2 are different entities. Hereinafter, the AE and the CSE will be described in detail.

Application Entity (AE): Application Entity provides Application logic for end-to-end M2M solutions. Examples of the Application Entities can be fleet tracking application, remote blood sugar monitoring application, or remote power metering and controlling application.

Common Services Entity (CSE): A Common Services Entity comprises the set of "service functions" that are common to the M2M environments and specified by oneM2M. Such service functions are exposed to other entities through Reference Points Mca and Mcc. Reference point Men is used for accessing Underlying Network Service Entities.

Node: A oneM2M Node is a functional entity that shall contain at least one oneM2M Common Services Entity and/or one oneM2M Application Entity. A oneM2M Node may be contained in a physical object, e.g., M2M Device, Gateway or Server Infrastructure.

The AE and the CSE may be logically present on nodes (e.g., an application service node, application dedicated node, middle node, and infrastructure node), and physically present in an M2M device, an M2M gateway, and an M2M server or M2M-related device. In this sense, the AE and the CSE may be referred to as M2M devices, M2M gateways or M2M servers (infrastructure).

Hereinafter, a server security object (or object instance), a server object instance (or object instance), and a firmware update object (or object instance) will be briefly described.

An M2M server security object (or object instance) provides a key material of an M2M client suitable to access a specific M2M server or M2M bootstrap server. One object instance is recommended to address the M2M bootstrap server. Resources of the M2M server security object may be changed by the M2M bootstrap server or a smartcard via a bootstrap interface, but cannot be accessed by any other M2M servers.

TABLE 17

| Object | Object ID | Object URN | Multiple Instances? | Mandatory? |
|---|---|---|---|---|
| LWM2M Security | 0 | | Multiple | Mandatory |

TABLE 18

| Resource Name | Resource ID | Supported Operations | Multiple Instances? | Mandatory? | Type | Range or Enumeration | Units | Descriptions |
|---|---|---|---|---|---|---|---|---|
| LWM2M Server URI | 0 | | Single | Mandatory | String | 0-255 bytes | — | Uniquely identifies the LWM2M Server or LWM2M Bootstrap Server, and is in the form: "coaps://host:port", where host is an IP address or FQDN, and port is the UDP port of the Server. |

TABLE 18-continued

| Resource Name | Resource ID | Supported Operations | Multiple Instances? | Mandatory? | Type | Range or Enumeration | Units | Descriptions |
|---|---|---|---|---|---|---|---|---|
| BootstrapServer | 1 | | Single | Mandatory | Boolean | | — | Determines if the current instance concerns a LWM2M Bootstrap Server (true) or a standard LWM2M Server(false) |
| Security Mode | 2 | | Single | Mandatory | Integer | 0-3 | — | Determines which security mode of DTLS is used 0: Pre-Shared Key(PSK) mode 1: Raw Public Key(RPK) mode 2: Certificate mode 3: NoSec mode |
| Public Key or Identity | 3 | | Single | Mandatory | Opaque | | — | Stores the LWM2M Client's Certificate (Certificate mode), public key (RPK mode) or PSK Identity (PSK mode). |
| Server Public Key or Identity | 4 | | Single | Mandatory | Opaque | | — | Stores the LWM2M Server's or LWM2M Bootstrap Server's Certificate (Certificate mode), public key (RPK mode) or PSK Identity (PSK mode). |
| Secret Key | 5 | | Single | Mandatory | Opaque | | — | Stores the secret key or private key of the security mode. This resource MUST only be changed by a bootstrap server and MUST NOT be readable by any server. |
| Short Server ID | 6 | | Single | Optional | Integer | 1-65535 | — | This identifier uniquely identifies each LWM2M Server configured for the LWM2M Client. This resource MUST be set when the Bootstrap Server resource has false value. Default Short Server ID (i.e. 0) MUST NOT be used for identifying the LWM2M Server. |
| ClientHoldOffTime | 7 | | Single | Mandatory | Integer | | s | Relevant information for a Bootstrap Server only. The number of seconds to wait before initiating a Client Initiated Bootstrap once the LWM2M Client has determined it should initiate this bootstrap mode. |

Next, a description will be given of an M2M server object (or object instance). The M2M server object provides data related to an M2M server. The M2M bootstrap server does not have an object instance related thereto.

TABLE 19

| Object | Object ID | Object URN | Multiple Instances? | Mandatory? |
|---|---|---|---|---|
| LWM2M Server | 1 | | Multiple | Mandatory |

TABLE 20

| Resource Name | Resource ID | Supported Operations | Multiple Instances? | Mandatory? | Data Type | Range or Enumeration | Units | Descriptions |
|---|---|---|---|---|---|---|---|---|
| Short Server ID | 0 | R | Single | Mandatory | Integer | 1-65535 | — | Used as link to associate server object instance. |
| Lifetime | 1 | R, W | Single | Mandatory | Integer | | s | Specify the lifetime of the registration in seconds. |
| Default Minimum Period | 2 | R, W | Single | Optional | Integer | | s | The default value the Client should use for the Minimum Period of an Observation in the absence of this parameter being included in an Observation. If this Resource doesn't exist, the default value is 1. |

TABLE 20-continued

| Resource Name | Resource ID | Supported Operations | Multiple Instances? | Mandatory? | Data Type | Range or Enumeration | Units | Descriptions |
|---|---|---|---|---|---|---|---|---|
| Default Maximum Period | 3 | R, W | Single | Optional | Integer | | s | The default value the Client should use for the Maximum Period of an Observation in the absence of this parameter being included in an Observation.) |
| Disable | 4 | E | Single | Optional | | | | If this Resource is executed, this LWM2M Server Object is disabled for a certain period defined in the Disabled Timeout Resource. After receiving "execute" logical operation, Client MUST send response of the operation and perform de-registration process, and underlying network connection between the Client and Server MUST be disconnected to disable the LWM2M Server account. After the above process, the LWM2M Client MUST NOT send any message to the Server and ignore all the messages from the LWM2M Server for the period. |
| Disable Timeout | 5 | R, W | Single | Optional | Integer | | s | A period to disable the Server. After this period, the LWM2M Client MUST perform registration process to the Server. If this Resource is not set, a default timeout value is 86400 (1 day). |
| Notification Storing When Disabled or Offline | 6 | R, W | Single | Mandatory | Boolean | | | If true, the LWM2M Client stores "Notify" logical operations to the LWM2M Server while the LWM2M Server account is disabled or the Client is offline. After the LWM2M Server account is enabled or the Client is online, the LWM2M Client reports the stored "Notify" logical operations to the Server. If false, the LWM2M Client discards all the "Notify" logical operations or temporally disables the Observe function while the LWM2M Server is disabled or the Client is offline. The default value is true. The maximum number of storing Notification per the Server is up to the implementation. |
| Binding | 7 | R, W | Single | Mandatory | String | | | This Resource defines the transport binding configured for the Client. If the Client supports the binding specified in this Resource, the Client MUST use that for Current Binding and Mode. |
| Registration Update Trigger | 8 | E | Single | Mandatory | | | | If this Resource is executed the LWM2M Client SHALL perform an"Update" logical operation with this LWM2M Server using the CurrentTransport Binding and Mode. |

Next, a description will be given of a firmware update object (or object instance). The firmware update object enables management of firmware to be updated in the M2M client. The firmware update object defines firmware package installation, firmware update, and operations after the firmware update.

TABLE 21

| Name | Object ID | Instances | Mandatory | Object URN |
|---|---|---|---|---|
| Firmware Update | 5 | Single | Optional | TBD |

TABLE 22

| ID | Name | Operations | Instances | Mandatory | Type | Range or Enumeration | Units | Description |
|----|------|------------|-----------|-----------|------|----------------------|-------|-------------|
| 0 | Package | W | Single | Mandatory | Opaque | | | Firmware package. The LWM2M server may store (install) the firmware package (image) on this resource through the operation command "Write". |
| 1 | Package URI | W | Single | Mandatory | String | 0-255 bytes | | URI from which the device can download the firmware package by an alternative mechanism. As soon the device has received the Package URI it performs the download at the next practical opportunity. |
| 2 | Update | E | Single | Mandatory | | | | Updates firmware by using the firmware package stored in Package, Alternatively, by using the firmware downloaded from the Package URI. This Resource is only executable when the value of the State Resource is Downloaded. |
| 3 | State | R | Single | Mandatory | Integer | 1-3 | | Indicates current state with respect to this firmware update. This value is set by the LWM2M Client.<br>1: Idle (before downloading or after updating)<br>2: Downloading (The data sequence is on the way)<br>3: Downloaded (before update)<br>If writing the firmware package to Package Resource is done, Alternatively, if the device has downloaded the firmware package from the Package URI the state changes to Downloaded.<br>If writing an empty string to Package Resource is done or writing an empty string to Package URI is done, the state changes to Idle.<br>If performing the Update Resource failed, the state remains at Downloaded.<br>If performing the Update Resource was successful, the state changes from Downloaded to Idle. |
| 4 | Update Supported Objects | RW | Single | Optional | Boolean | | | If this value is true, the LWM2M Client MUST inform the registered LWM2M Servers of Objects and Object Instances parameter by sending an Update or Registration message after the firmware update operation at the next practical opportunity if supported Objects in the LWM2M Client have changed, in order for the LWM2M Servers to promptly manage newly installed Objects.<br>If false, Objects and Object Instances parameter MUST be reported at the next periodic Update message.<br>The default value is false. |
| 5 | Update Result | R | Single | Mandatory | Integer | 0-6 | | Contains the result of downloading or updating the firmware<br>0: Default value. Once the updating process is initiated, this Resource SHOULD be reset to default value.<br>1: Firmware updated successfully,<br>2: Not enough storage for the new firmware package.<br>3. Out of memory during downloading process.<br>4: Connection lost during downloading process.<br>5: CRC check failure for new downloaded package,<br>6: Unsupported package type.<br>7: Invalid URI |

TABLE 22-continued

| ID | Name | Operations | Instances | Mandatory | Type | Range or Enumeration | Units | Description |
|---|---|---|---|---|---|---|---|---|
| | | | | | | | | This Resource MAY be reported by sending Observe operation when the value of the resource changes. |

Figure 6:
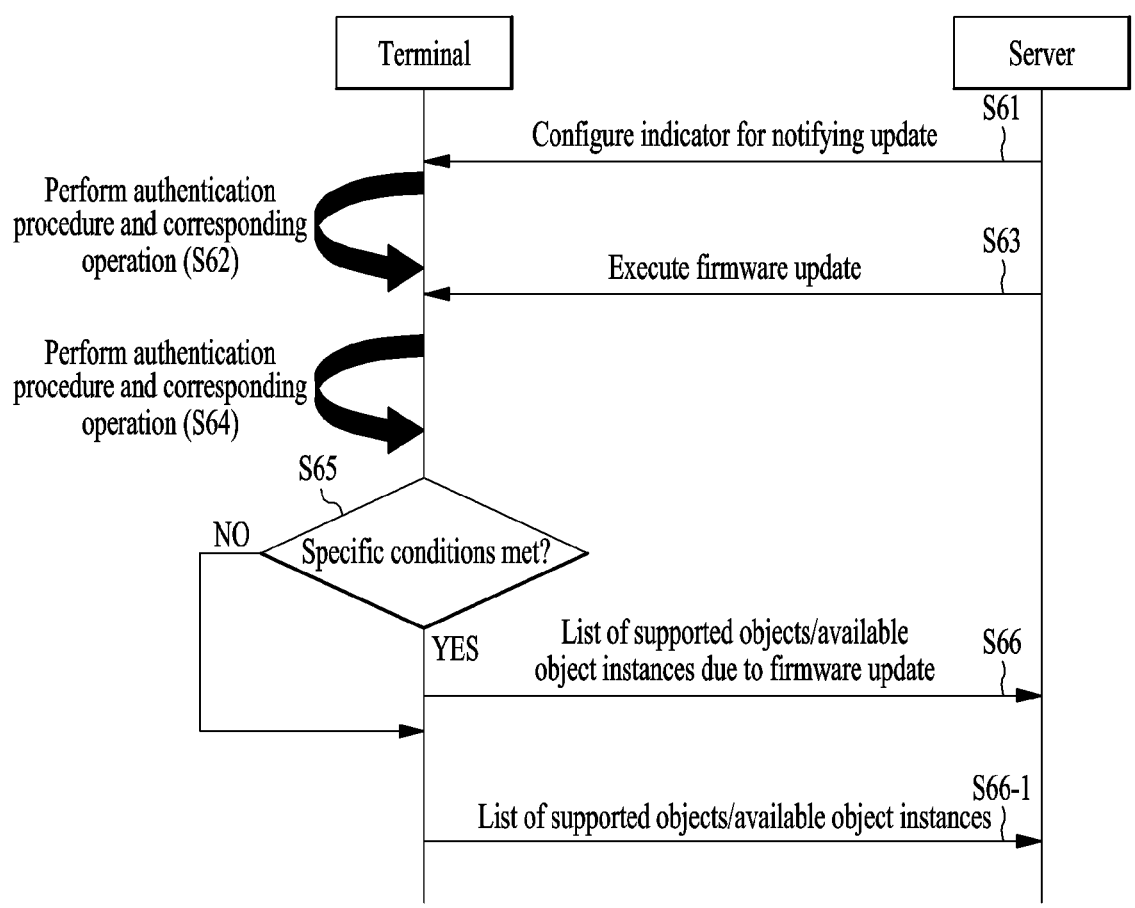
FIG. 6 is a flowchart illustrating a procedure of notifying update of firmware or software and information changed by the update according to an embodiment of the present invention.

FIG. 6 is a flowchart illustrating a procedure of notifying the result of firmware update according to an embodiment of the present invention. This embodiment will be described below based on the foregoing descriptions.

An M2M server (hereinafter, referred to as "server") may request an M2M client (hereinafter, referred to as "terminal") to configure an indicator for indicating the notification (S61). The indicator for indicating the notification is intended for immediate aperiodic notification. As described above, if the indicator is not configured to have a specific value for the aperiodic notification, the result of the update (e.g., a changed object, a supported resource group, a function, or the like) may be delivered through periodic notification.

More specifically, the indicator may be a specific resource in a specific instantiated resource group (i.e., an object instance) in the terminal. For example, the indicator may be the "Update Supported Objects" resource of the firmware update object instance described above. By setting the value of the "Update Supported Objects" resource to True, a request for the aperiodic notification may be made to the terminal.

Additionally, a request for setting the "Update Supported Objects" resource to a specific value may be made by the server by transmitting, to the terminal, the operation command "Write" targeting the aforementioned resource. The operation command "Write" includes a new value (i.e., payload) (e.g., true) to write.

Upon receiving the request, the terminal may perform an authentication procedure for the request and a corresponding operation according to the result of the procedure (S62).

The authentication procedure is the hierarchical authentication procedure described above. More specifically, it may be determined whether the procedure is authentication of an access right for the resource of the service through an access control object instance and whether the resource supports the operation command "Write". The authentication procedure is assumed to be performed based on the description given above.

If the server has an access right for the resource and it is determined that the resource supports the operation command "Write", the terminal may write the new value (i.e., true) in the resource. Otherwise, the terminal may transmit, to the server, an error code indicating that the authentication procedure has failed.

Hereinafter, description will be given on the assumption that the authentication procedure has been successfully completed and thus the value of the "Update Supported Objects" resource is set to True.

Thereafter, the server may request the terminal to update firmware (S63). For example, a new version of the firmware installed in the terminal may be distributed (installed). The request may be made through the operation command "Execute" for a specific resource in the firmware update object instance. For example, the specific resource is an "Update" resource. The operation command "Execute" for the "Update" resource is set to perform update of the firmware in the terminal using a package of the "Package" resource or a firmware package (image) downloaded from the "Package URI".

In this case, an authentication procedure for the operation command "Execute" and a corresponding operation according to the result of the procedure, i.e., firmware update need to be performed (S64). For details of the authentication procedure and the corresponding operation, refer to the description given above. In the description given below, it will be assumed that the authentication procedure of S54 has been successfully completed.

When firmware update is completed, the terminal may determine whether specific conditions are met (S65). More specifically, the specific conditions may include: i) whether an object supported by the terminal, an existing object instance, a supported resource group, an instantiated resource group or a function has been changed by the firmware update; and ii) whether the indicator is set to a value True.

When all the specific conditions are met, the terminal may notify the server of a list of supported objects changed by the firmware update or available object instances (S66). The list of the objects supported by the terminal or available object instances includes not only objects/object instances changed through the firmware update but also unchanged objects/object instances. That is, the list includes all objects or available object instances supported by the terminal after firmware update, which is intended to address a problem which may occur when only changed objects/object instances are announced. A more detailed description will be given later in this specification.

Preferably, the notification is delivered as early as possible. The notification may be performed using the operation command (or message) "Update" or "Register".

If any one of the specific conditions is not met, the terminal may deliver, to the server, the list of objects supported by the terminal or object instances available to the terminal through a periodically transmitted operation command "Update" at the next transmission time for the periodic operation command "Update" (S66-1).

Notified Information=List of Object/Object Instance(s)

The information delivered to the server in S66 includes not only supported objects or object instances (i.e., supported resource groups or instantiated resource groups) changed by the firmware update but also unchanged objects or object instances (i.e., supported resource groups or instantiated resource groups). The reason why information (a list) of objects and available object instances supported by the terminal after the firmware update should be notified to the server will be explained by a scenario described below. Herein, the available object instance may refer to an object instance which can be exposed to the server among object instances present in the terminal (for example, all object instances except server security object instances which are not accessed by (exposed to) the server).

The terminal periodically updates the registered information through the operation command (or message) "Update", which is related to Table 6. As shown in Table 6, the registered information contains "Objects and Object Instances", which corresponds to a list of objects supported by the terminal and available object instances. Since the terminal periodically transmits the list to the server through the operation command "Update", the server may recognize the list from the terminal at least periodically. Hereinafter, description will be given of a case where firmware update occurs at least twice between preset periods. Meanwhile, even if firmware update occurs once between the preset periods, and only information changed by the firmware update is notified, the server(s) may recognize objects currently supported by the terminal and available object instance(s) by combining the list of the terminal acquired through the latest periodic notification and the changed information.

Figure 7:
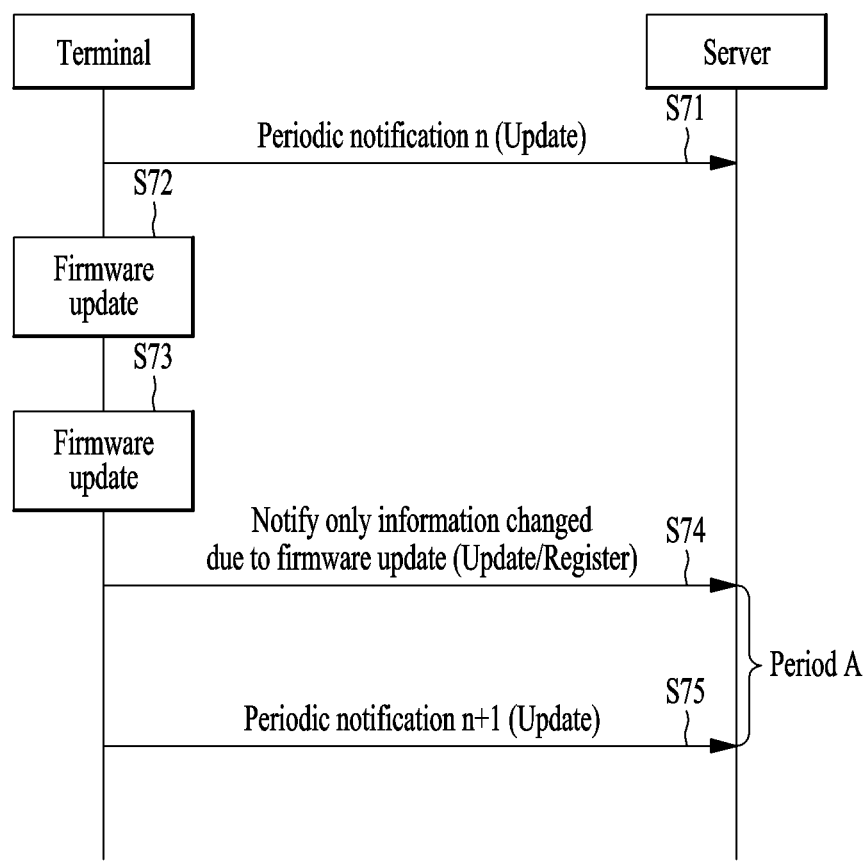
FIG. 7 illustrates an example compared with an embodiment of the present invention.

FIG. 7 illustrates a problem with notification of only information changed by firmware update according to an embodiment of the present invention. FIG. 7 schematically shows a part selected from FIG. 6. To actually implement the example of FIG. 7, a few more procedures illustrated in FIG. 6 (e.g., an authentication procedure) are needed. In FIG. 7, it is assumed that only supported objects and available object instances changed by firmware update are transmitted to the server when notification is performed by the terminal, contrary to the case of FIG. 6.

The terminal transmits a periodic notification n to the server (S71). The periodic notification n may include an object supported by the terminal and available object instance(s). Thereafter, the terminal may perform firmware update (S72). However, according to description given above in relation to FIG. 6, the terminal does not perform notification to the server since the indicator for the notification is set to false.

Thereafter, the terminal may perform another firmware update (S73). In this case, since the indicator for the notification is set to True, the terminal may notify the server of only information changed by the firmware update (S74). That is, the server may acquire only information changed by the firmware update of S73 between periodic notifications and cannot acquire information changed by the firmware update of S62. Accordingly, the server cannot recognize accurate information on the object supported by the terminal or available object instance during period A. Thereby, the server cannot use/support a corresponding function.

Thereafter, the terminal may transmit periodic notification n+1 to the server (S75). Thereby, the server may acquire a list of all objects supported by the terminal and all available object instances.

Meanwhile, even if notification according to firmware update is performed in relation to firmware update of S72, the same problem occurs (namely, S74 is performed between S72 and S73). In this case, the time of period A increases.

Accordingly, as described above with reference to FIG. 6, even in the case of notification caused by firmware update, not only information changed by the update but also all other information may be transmitted in order to allow servers in which the terminal has been registered to use all functions supported by/available to the terminal.

The term "firmware" which has been employed in the embodiments described above covers all concepts such as "software," "program," and "application", and thus the scope of the invention is not confined simply to the firmware.

Types Access Control Object Instance

According to another embodiment of the present invention, two types of access control object instances are proposed. Once a specific object instance is created according to operation command "Create", the M2M server that has transmitted the operation command "Create" is given all rights for the created specific object instance. In this way, the operation command "Create" may grant a relatively authority. In this regard, a dedicated access control object instance (hereinafter, referred to as "a first type object instance") for the operation command "Create" is proposed.

The first type object instance may be used to authenticate an access right for the operation command "Create" for a specific object instance. Referring to the normal access control object instance (see Table 16), only the resources Object ID and ACL of the normal access control object instance may be configured for the first type object instance, and the other resources of the normal access control object instance may not be configured for the first type object instance. Alternatively, only resources Object ID and ACL of the normal access control object instance may be configured for the first type object instance, and the other resources of the normal access control object instance may be set to any values. The resource ACL explicitly indicates an M2M server and possibility of creation, and the M2M client may determine whether or not the M2M server can create an object instance of an object corresponding to Object ID.

Authentication of the access right for the operation command "Create" may be performed according to the values indicated by the first type object instance. Of course, only the M2M server indicated by the resource of the first type object instance and a resource value is allowed to have the access right for the operation command "Create" for the object instance of a specific object indicated by the value of the resource.

Since the first type object instance is intended for the operation command "Create", it is not used for the other operation commands. In addition, the first type object instance may be configured, created or managed only via the bootstrap interface.

Next, a second type object instance is proposed. The second type object instance is intended for authentication of an access right for an operation command other than the operation command "Create". This object instance is identical to the normal access control object instance shown in Table 16 (namely, Object ID, Object Instance ID, ACL, and Access Control Owner are configured) except that the second type object instance does not support the operation command "Create". Accordingly, the second type object instance is managed by an access control owner, and is not used for operation command "Create".

Figure 8:
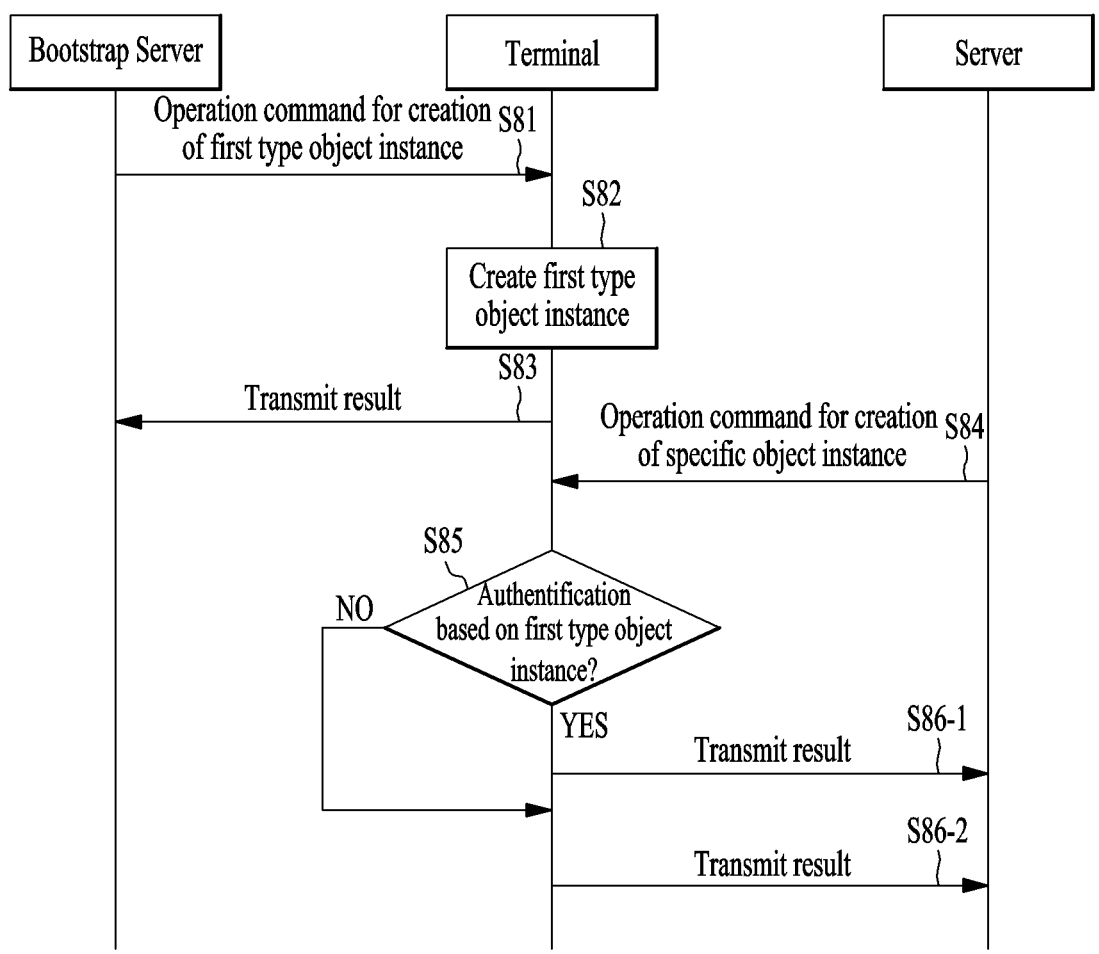
FIG. 8 is a flowchart illustrating an authentication procedure according to an embodiment of the present invention.

FIG. 8 illustrates creation of an object instance for access control and an authentication procedure using the same according to another embodiment of the present invention.

An M2M bootstrap server (hereinafter, referred to as a bootstrap server) may transmit an operation command for creation of the first type object instance to an M2M client (hereinafter, referred to as a terminal) (S81). The bootstrap server may transmit a specific operation command to the terminal via a bootstrap interface. For example, the operation command for creation of the first type object instance may be the operation command "Write" (or "Create"), and the terminal should record the payload of the operation command "Write" in the terminal even if an object subjected to the operation command "Write" via the bootstrap interface is an object instance or resource that is not found in the terminal (i.e., regardless of existence of the object instance or resource subjected to the operation command). That is, the terminal may create the first type object instance (S82). Meanwhile, the first type object instance, which relates to the operation command "Create", may be created and managed only through the bootstrap interface, namely only by the bootstrap server. Since the M2M server having transmitted the operation command "Create" has all rights for the object instance created by the operation command "Create" and performs relevant management, only creation of the first type object instance via the bootstrap interface is allowed. Herein, transmission is not limited to transmission via the M2M bootstrap server, and bootstrap from a smartcard using a bootstrap interface or manufacturer bootstrap may also be used.

The terminal may transmit the result of implementation of the operation command "Write" to the bootstrap server (S83).

Then, a specific M2M server (hereinafter referred to simply as a server) may transmit an operation command for creation of a specific object instance to the terminal (S84). The operation command for creation of the specific object instance may be the operation command "Create", and a corresponding authentication procedure needs to be performed as in the case of the "access control technique" described above. The operation command "Create" is received via a "device management and service enablement" interface. In this embodiment, a detailed description will not be given of the authentication procedure. For details of the procedure, refer to the description given above.

The terminal may perform authentication for the operation command "Create" based on the first type object instance (S85). If authentication is successfully completed, the terminal may transmit the result of authentication to the server (S86-1). Otherwise, the terminal may transmit a corresponding result to the server (S86-2). If authentication is successful, the terminal creates the specific object instance. Otherwise, the specific object instance is not created.

Figure 9:
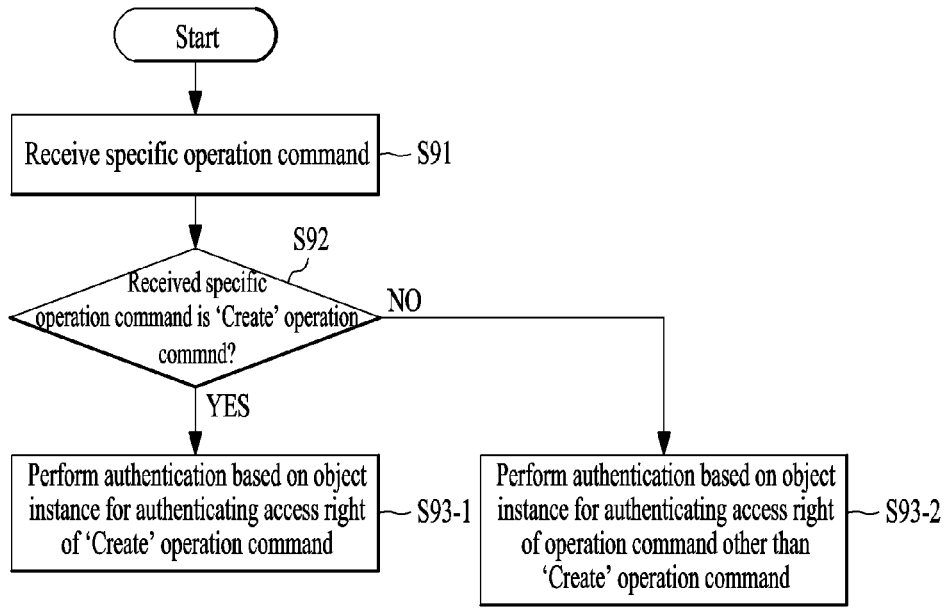
FIG. 9 is a flowchart illustrating an authentication procedure according to an embodiment of the present invention.

FIG. 9 illustrates creation of an object instance for access control and an authentication procedure using the same according to another embodiment of the present invention.

The terminal may receive a specific operation command from the server (S91). The specific operation command may be received via the "device management and service enablement" interface. The specific operation command may be one of "Read," "Create," "Delete," "Write," and "Execute".

When there are two types of access control object instances as described above, an access control object instance to be used to perform authentication of the specific operation command depends on which of the operation commands is the specific operation command.

Accordingly, the terminal may determine whether the received specific operation command is the operation command "Create" (S92).

If the specific operation command is the operation command "Create", the terminal may use an access control object instance for authentication of the access right of the operation command "Create" (S93-1). If an access control object instance for authenticating the access right of the operation command "Ceate" does not exist, namely if the access control object instance has not been created yet, authentication will end in failure.

If the specific operation command is not the operation command "Create", the terminal may use an access control object instance for authenticating the access right of the specific operation command (S93-2).

After step S93-1 or S83-2 is performed, the terminal may transmit the result of the authentication to the server.

While operation commands delivered via the bootstrap interface are described in the embodiment described above, embodiments of the present invention are not limited thereto. A relevant command or information such as a bootstrap message and a bootstrap instruction that are delivered from a bootstrap server or a smartcard to configure the terminal, or a relevant command or information that is stored in a specific region (e.g., a flash memory, a secured environment, or a trusted platform module (TPM)) for bootstrap may also be employed.

In this embodiment, the term "bootstrap server" may be replaced by another term such as a specific storage region (e.g., a flash memory, a secured environment, a trusted platform module (TPM)) for bootstrap, and an M2M service bootstrap function) that functions to deliver or store basic information about the terminal (e.g., a security key, a terminal/application ID, an address, or information for connection/registration of other entities).

Figure 10:
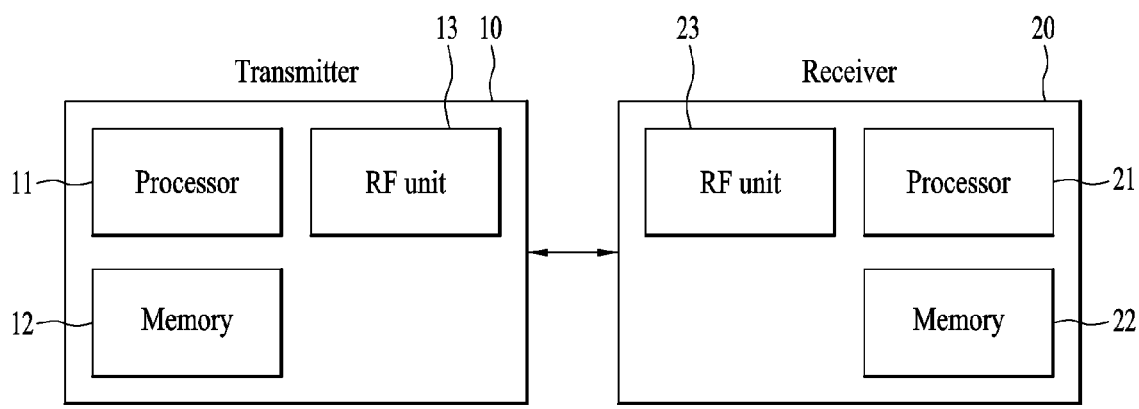
FIG. 10 is a block diagram of an apparatus for implementing embodiments of the present invention.

FIG. 10 is a block diagram of an apparatus for implementing the embodiments of the present invention. A transmitting device 10 and a receiving device 20 respectively include radio frequency (RF) units 13 and 23 for transmitting and receiving RF signals carrying information and/or data, signals, messages, etc., memories 12 and 22 storing information related to communication in a wireless communication system, and processors 11 and 21 which are operatively connected to the RF units 13 and 23 and the memories 12 and 22 and control the RF units 13 and 23 and the memories 12 and 22 such that the transmitter and the receiver perform at least one of the embodiments of the present invention.

The memories 12 and 22 can store programs for processing and control of the processors 11 and 21 and temporarily store input/output information. The memories 12 and 22 can function as buffers.

The processors 11 and 21 control overall operations of modules in the transmitter and the receiver. Particularly, the processors 11 and 12 can execute various control functions for implementing the present invention. The processor may be referred to as a controller, microcontroller, microprocessor, microcomputer, etc. The processors 11 and 21 may be achieved by various means, for example, hardware, firmware, software, or a combination thereof. When the present invention is implemented using hardware, ASICs (application specific integrated circuits), DSPs (digital signal processors), DSDPs (digital signal processing devices), PLDs (programmable logic devices), FPGAs (field programmable gate arrays), etc. configured to implement the present invention can be included in the processors 11 and 12. When the present invention is implemented using firmware or software, firmware or software can be configured to include a module, a procedure, a function, etc. for executing functions or operations of the present invention. The firmware or software configured to implement the present invention can be included in the processors 11 and 21 or stored in the memories 12 and 22 and executed by the processors 11 and 21.

In the embodiments of the present invention, an M2M server, an M2M client, a server or a terminal can operate as an apparatus in which the M2M server, M2M client, server or terminal is mounted or installed, that is, the transmitting device 10 or the receiving device 20.

The M2M server, M2M client, server or terminal as the transmitting device or receiving device can be configured such that the aforementioned embodiments of the present invention are independently applied or two or more thereof are simultaneously applied.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention can be used for a terminal, a base station, a server or other apparatus of a wireless mobile communication system.

The invention claimed is:

1. A method for notifying, by a terminal, a change of at least one resource group supported by the terminal due to an update of a firmware of the terminal in a wireless communication system, the method comprising:
receiving, from a server, an operation command for configuring an indicator for indicating the notification;
receiving, from the server, an operation command for indicating an execution of the update of the firmware; and
transmitting, to the server, information about the at least one resource group supported by the terminal and/or at least one resource group available to the terminal when the indicator is set to have a predetermined value and the at least one resource group supported by the terminal is changed according to the execution of the update.

2. The method according to claim 1, wherein the operation command for configuring the indicator includes an operation command for writing a value for an activation of the notification in a specific resource of a resource group related to the firmware.

3. The method according to claim 1, wherein the information about the at least one resource group supported by the terminal and/or the at least one resource group available to the terminal is transmitted via a message for an update of registered information about the terminal for the server or a message for a registration of information about the terminal for the server.

4. The method according to claim 3, wherein the information about the at least one resource group supported by the terminal and/or the at least one resource group available to the terminal is contained in a specific parameter of the message.

5. The method according to claim 1, wherein, when the indicator is not configured, the information about the at least one resource group supported by the terminal and/or the at least one resource available to the terminal is periodically transmitted.

6. A method for receiving, by a server, a notification of a change of at least one resource group supported by a terminal due to an update of a firmware in a wireless communication system, the method comprising:
configuring an indicator for indicating the notification;
transmitting, to the terminal, an operation command for indicating an execution of the update of the firmware; and
receiving information about the at least one resource group supported by the terminal and/or at least one resource group available to the terminal when the indicator is set to have a predetermined value and the at least one resource group supported by the terminal is changed according to the execution of the update.

7. The method according to claim 6, wherein configuring the indicator comprises transmitting, to the terminal, an operation command for writing a value for an activation of the notification in a specific resource of a resource group related to the firmware.

8. The method according to claim 6, wherein the information about the at least one resource group supported by the terminal and/or the at least one resource group available to the terminal is received via a message for an update of registered information about the terminal for the server or a message for a registration of information about the terminal for the server.

9. The method according to claim 8, wherein the information about the at least one resource group supported by the terminal and/or the at least one resource group available to the terminal is contained in a specific parameter of the message.

10. The method according to claim 6, wherein, when the indicator is not configured, the information about the at least one resource group supported by the terminal and/or the at least one resource group available to the terminal is periodically received.

11. A terminal configured to notify a change of at least one resource group supported by the terminal due to an update of a firmware in a wireless communication system, the terminal comprising:
a radio frequency (RF) unit; and
a processor configured to control the RF unit,
wherein the processor is configured to:
receive, from a server, an operation command for configuring an indicator for indicating the notification,
receive, from the server, an operation command for indicating an execution of the update of the firmware, and
transmit, to the server, information about the at least one resource group supported by the terminal and/or at least one resource group available to the terminal when the indicator is set to have a predetermined value and the at least one resource group supported by the terminal is changed according to the execution of the update.

12. A server configured to receive a notification of a change of at least one resource group supported by a terminal due to an update of a firmware in a wireless communication system, the server comprising:
a radio frequency (RF) unit; and
a processor configured to control the RF unit,
wherein the processor is configured to:
configure an indicator for indicating the notification,
transmit, to the terminal, an operation command for indicating an execution of the update of the firmware, and
receive information about the at least one resource group supported by the terminal and/or at least one resource group available to the terminal when the indicator is set to have a predetermined value and the at least one resource group supported by the terminal is changed according to the execution of the update.

* * * * *